United States Patent [19]

Shahrodi

[11] Patent Number: 5,126,642

[45] Date of Patent: Jun. 30, 1992

[54] VARIABLE SPEED MOTOR CONTROL

[75] Inventor: Ebrahim B. Shahrodi, Colleyville, Tex.

[73] Assignee: Ranco Incorporated of Delaware, Wilmington, Del.

[21] Appl. No.: 646,530

[22] Filed: Jan. 31, 1991

[51] Int. Cl.$^5$ .............................................. H02P 7/29
[52] U.S. Cl. ................................... 318/433; 318/268; 388/819
[58] Field of Search ............... 318/268, 430, 431, 432, 318/433, 434, 599; 388/811, 819

[56] References Cited

U.S. PATENT DOCUMENTS

| | | |
|---|---|---|
| 4,407,139 | 10/1983 | Ide et al. . |
| 4,450,519 | 7/1984 | Erdman . |
| 4,467,261 | 8/1984 | Lamaster . |
| 4,471,632 | 9/1984 | Nishi et al. . |
| 4,506,318 | 3/1985 | Nilssen . |
| 4,514,991 | 5/1985 | Zinsmeyer . |
| 4,539,823 | 9/1985 | Nishi et al. . |
| 4,561,260 | 12/1985 | Nishi et al. . |
| 4,562,524 | 12/1985 | Mutoh et al. . |
| 4,580,064 | 4/1986 | Varnoritsky . |
| 4,587,605 | 5/1986 | Kowyama et al. . |
| 4,599,549 | 7/1986 | Mutoh et al. . |
| 4,604,872 | 8/1986 | Miyazaki et al. . |
| 4,611,158 | 9/1986 | Nagase et al. . |
| 4,614,089 | 9/1986 | Dorsey . |
| 4,615,000 | 9/1986 | Fujii et al. . |
| 4,617,472 | 10/1986 | Slavik .................. 307/38 X |
| 4,618,810 | 10/1986 | Hagerman et al. . |
| 4,621,316 | 11/1986 | Uesugi . |
| 4,628,475 | 12/1986 | Azusawa et al. . |
| 4,629,959 | 12/1986 | Okuyama et al. . |
| 4,633,158 | 12/1986 | Hirata et al. . |
| 4,633,675 | 1/1987 | Sato . |
| 4,636,928 | 1/1987 | Deguchi et al. . |
| 4,646,534 | 3/1987 | Russell . |
| 4,646,535 | 3/1987 | Matsuoka et al. . |
| 4,658,596 | 4/1987 | Kuwahara . |
| 4,662,185 | 5/1987 | Kobayashi et al. . |
| 4,667,480 | 5/1987 | Bessler ................... 62/180 |
| 4,672,524 | 6/1987 | Toriyama et al. . |
| 4,677,360 | 6/1987 | Garces . |
| 4,680,526 | 7/1987 | Okuyama et al. . |
| 4,691,269 | 9/1987 | Yamane et al. . |
| 4,698,744 | 10/1987 | Itani et al. . |
| 4,706,180 | 11/1987 | Wills . |
| 4,716,347 | 12/1987 | Fujimoto ............... 318/460 |
| 4,720,777 | 1/1988 | Yokoi . |
| 4,720,981 | 1/1988 | Helt et al. . |
| 4,720,982 | 1/1988 | Shimizu et al. . |
| 4,723,201 | 2/1988 | Tanamachi et al. . |
| 4,724,680 | 2/1988 | Kawai . |
| 4,736,143 | 4/1988 | Nakamura et al. ........ 318/432 |
| 4,736,148 | 4/1988 | Hirata . |
| 4,736,595 | 4/1988 | Kato . |
| 4,748,822 | 6/1988 | Erbs et al. . |
| 4,758,938 | 7/1988 | Kanazawa . |
| 4,763,059 | 8/1988 | Espelage et al. . |
| 4,764,713 | 8/1988 | D'Atre et al. . |
| 4,766,735 | 8/1988 | Gotou . |
| 4,767,976 | 8/1988 | Mutoh et al. . |
| 4,772,996 | 9/1988 | Hanei et al. . |
| 4,777,578 | 10/1988 | Jahns . |
| 4,777,579 | 10/1988 | Jahns et al. . |
| 4,779,183 | 10/1988 | Mutoh et al. . |
| 4,800,476 | 1/1989 | Harada et al. . |
| 4,800,478 | 1/1989 | Takahashi . |
| 4,802,077 | 1/1989 | Fujii et al. . |
| 4,806,839 | 2/1989 | Nagato et al. . |
| 4,807,103 | 2/1989 | Uesugi . |
| 4,810,943 | 3/1989 | Kawaguchi et al. . |
| 4,833,586 | 5/1989 | Inaka et al. . |
| 4,856,286 | 8/1989 | Sulfstede et al. . |
| 4,879,502 | 11/1989 | Endo et al. .............. 318/723 |
| 4,893,479 | 1/1990 | Gillett et al. ........... 318/806 X |
| 5,006,045 | 4/1991 | Shimoda et al. ......... 318/758 X |
| 5,023,531 | 6/1991 | Altemose et al. ........ 318/471 |

FOREIGN PATENT DOCUMENTS 3702658 8/1987 Fed. Rep. of Germany .
2161298 1/1986 United Kingdom .

Primary Examiner—Bentsu Ro
Attorney, Agent, or Firm—Watts, Hoffmann, Fisher & Heinke Co.

[57] ABSTRACT

A motor control for a multi-phase compressor motor. The control responds to a speed control signal to cause the motor speed to track the speed control signal without changing the motor torque. This is accomplished by pulse width modulating motor speed signals in a sinusoidal manner to maintain the volts/hertz applied to the motor constant regardless of motor speed.

23 Claims, 18 Drawing Sheets

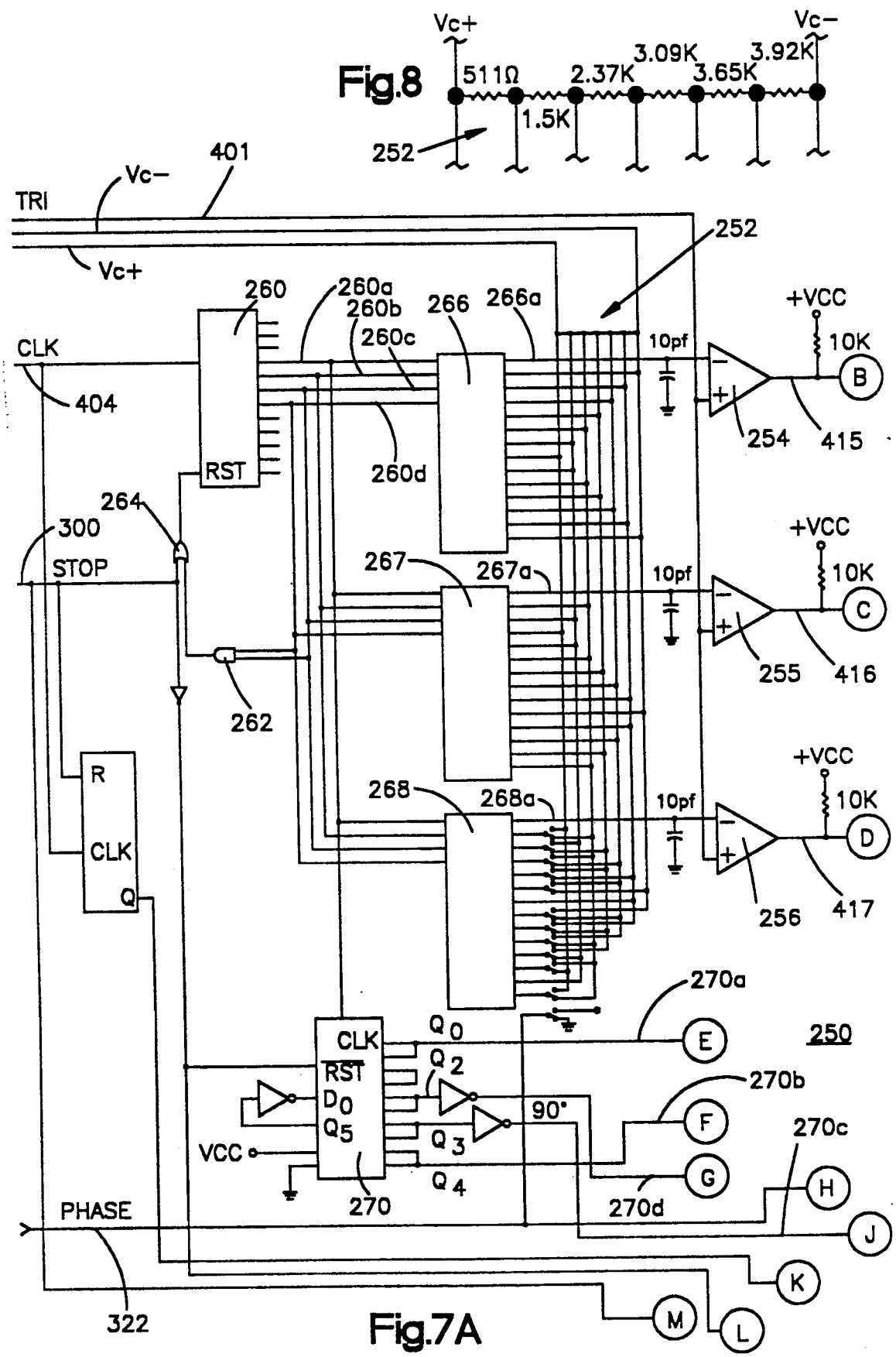

VARIABLE SPEED MOTOR CONTROL

FIELD OF THE INVENTION

The present invention concerns a motor speed control system for energizing a multi-phase motor. One use of the motor speed control system is for regulating the speed of a compressor motor which moves refrigerant through a heat exchanger. The compressor motor speed is adjusted in response to the heating or cooling requirements of a region in thermal communication with the heat exchanger.

BACKGROUND ART

A known technique for controlling the temperature of a heating and/or cooling region is to cyclically activate a compressor motor to force refrigerant through a heat exchanger in thermal communication with the region. There are disadvantages in operating a compressor motor in this cyclic on/off fashion. The compressor motor's life is shortened when it cycles on and off and such operation is not the most energy efficient heat exchange method. If the on/off durations are lengthened (using a hysteresis control for example) less precise control over the temperature within the region occurs since the temperature continually cycles above and below the desired set-point temperature.

U.S. Pat. No. 4,893,479 to Gillett which issued Jan. 16, 1990 and is assigned to the assignee of the present invention discloses a variable speed motor control for a multi-phase induction motor. The disclosure of this patent is incorporated herein by reference.

The motor control disclosed in the '479 patent activates a three-phase induction motor at a continuously variable speed by controlled activation of an inverter circuit. The motor control disclosed in the '479 patent is described as being for use with any multi-phase compressor motor. The refrigeration uses of the '479 system thus include refrigerators, freezers, heat pumps, or air conditioners. Instead of operating the compressor motor at a constant speed during an on cycle, the system disclosed in the '479 patent activates the compressor motor at a continuously variable range of speeds during heating or cooling periods. The heating or cooling demands of the control volume dictate the speed at which the motor operates. So long as the heating and/or cooling demands do not change, the motor control causes the compressor motor to operate at a narrow range of speed which satisfies the heating and/or cooling requirements and is not subject to the cyclic temperature variations caused by intermittent compressor motor operation.

The apparatus disclosed in the '479 patent includes a circuit for generating a speed control signal and a voltage control oscillator for generating a cyclicly varying wave form having a pulse width modulated output to achieve constant motor torque. The constant torque output of the induction motor disclosed in the '479 patent is achieved by maintaining the volts per hertz across the motor winding constant regardless of motor speed. While the system disclosed in the '479 patent achieves this function, the step voltage increments used to simulate a standard sinusoidal energization of the motor windings are only approximations.

The application of a constant volts per hertz to provide uniform torque output from a variable speed multi-phase motor is a principal goal of the motor control of the '479 patent. The present invention, achieves multi-phase variable speed motor operation in response to a control input utilizing the general principals disclosed in the '479 patent. By extending these principles, however, a more accurate and flexible motor energization control is achieved.

DISCLOSURE OF THE INVENTION

The present invention concerns a motor control for applying a voltage across the windings of a multi-phase motor. The control causes the motor to operate at a controlled speed and also produces relatively constant torque output from the motor across a range of motor speeds. The preferred use of the motor control is with a compressor motor used in moving refrigerant through a heat exchanger.

Apparatus constructed in accordance with one embodiment of the invention includes a control circuit for responding to a speed control input signal designating a target compressor motor speed. This speed control input signal in its simplest form, is proportional to the difference between a set-point temperature and a sensed temperature. A processing circuit converts the speed control input signal into a pulse width modulated signal having a fundamental frequency that is related to a target motor speed. An output circuit couples phase shifted motor energization signals to an inverter circuit coupled to the motor windings of the multi-phase motor.

In an instance in which a three-phase motor is driven by the control, for example, three phase shifted signals that are delayed with respect to each other by 120 degrees of the total 360 degree cycle are generated and applied to switches that couple a DC energization voltage across the three motor windings of the three-phase motor to effect motor rotation at the target compressor motor speed.

BRIEF DESCRIPTION OF THE DRAWINGS

FIGS. 7A and 7B are detailed electrical schematics showing an output portion of the custom integrated circuit depicted in FIG. 3;

FIG. 8 is an enlarged schematic showing a portion of the FIG. 7A circuit; and

BEST MODE FOR CARRYING OUT THE INVENTION

Figure 1:
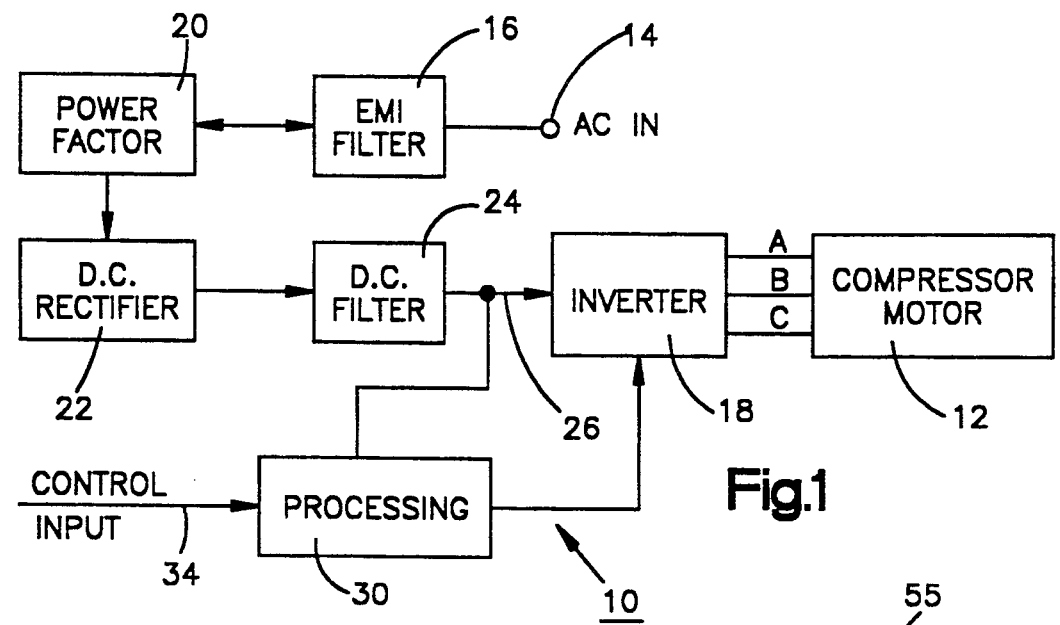
FIG. 1 is a schematic of a control system for energizing a multi-phase motor.

FIG. 1 is a block diagram of an electronic control system 10 that activates a multi-phase compressor motor 12. The compressor motor 12 is used to move refrigerant through a heat exchanger used in an air conditioner, heat pump, refrigerator or the like. The preferred use of the disclosed control system 10 is in activating an air conditioner compressor motor.

The electronic control system 10 depicted in FIG. 1 includes an input 14 for an alternating current signal. Typically this alternating signal input 14 will receive 60 cycle (50 cycle for European applications) 110 or 220 volt signals.

An EMI filter 16 suppresses noise generated by the electronic control system 10 and prevents this noise from degrading the alternating current signal coupled to the system 10 via the input 14. A conductive shield or enclosure (not shown) is placed around an inverter circuit 18 to prevent high frequency switches within the inverter circuit 18 from interfering with other household appliances.

A power factor circuit 20 is coupled to an output from the EMI filter 16 and includes an inductor for adjusting a phase relationship between current and voltage from the AC input 14. A DC rectifier 22 is coupled to the power factor circuit 20 and rectifies the alternating current signal from the input 14 and transmits an output to a DC filter circuit 24. The output from the DC rectifier 22 constitutes a pulsating DC signal and the DC filter circuit 24 removes the ripple from the rectifier output.

An output 26 from the DC filter circuit 24 has a value of approximately 275 volts DC. This output is coupled to the inverter circuit 18. The inverter circuit 18 has three pairs of high speed switches (described in detail below) that couple the D.C. voltage to the motor 12. In the disclosed and preferred embodiment of the invention the motor 12 is a three-phase motor.

A processing circuit 30 controls a conductive state of the high speed switches within the inverter circuit 18. The processing circuit 30 includes an input 34 for receipt of information used in determining a target rotation speed for the compressor motor 12. The processing circuit 30 also monitors status conditions such as overcurrent or overvoltage conditions at the D. C. signal output 26.

D.C. Rectifier Circuits

Figure 2A:
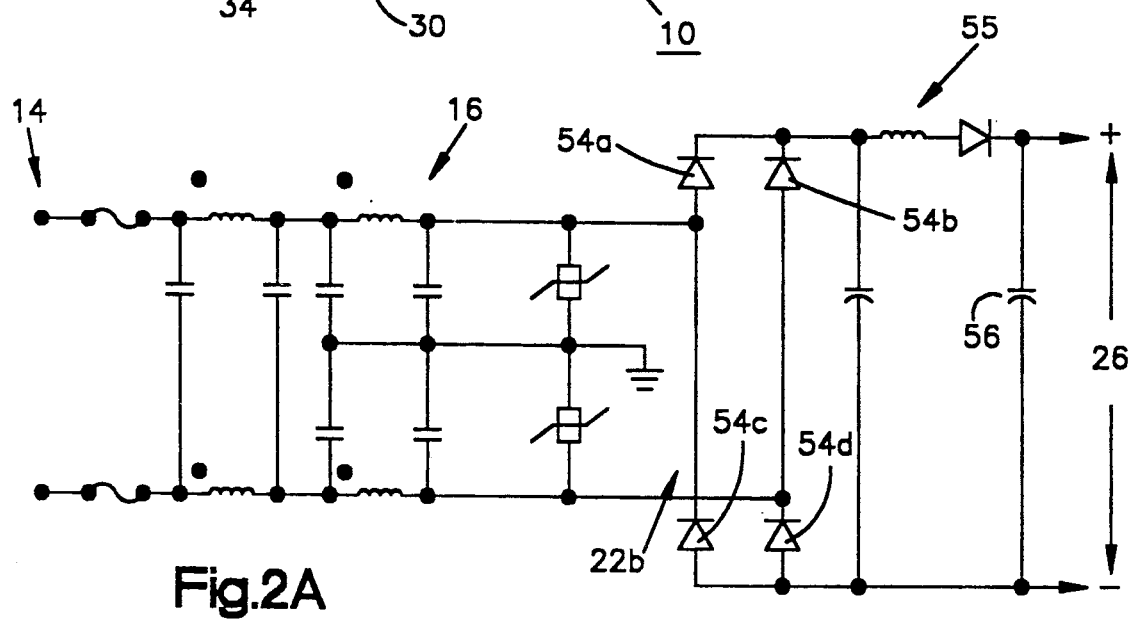
FIG. 2A is a detailed schematic of a rectifier circuit for producing a DC output from an AC input.
Figure 2B:
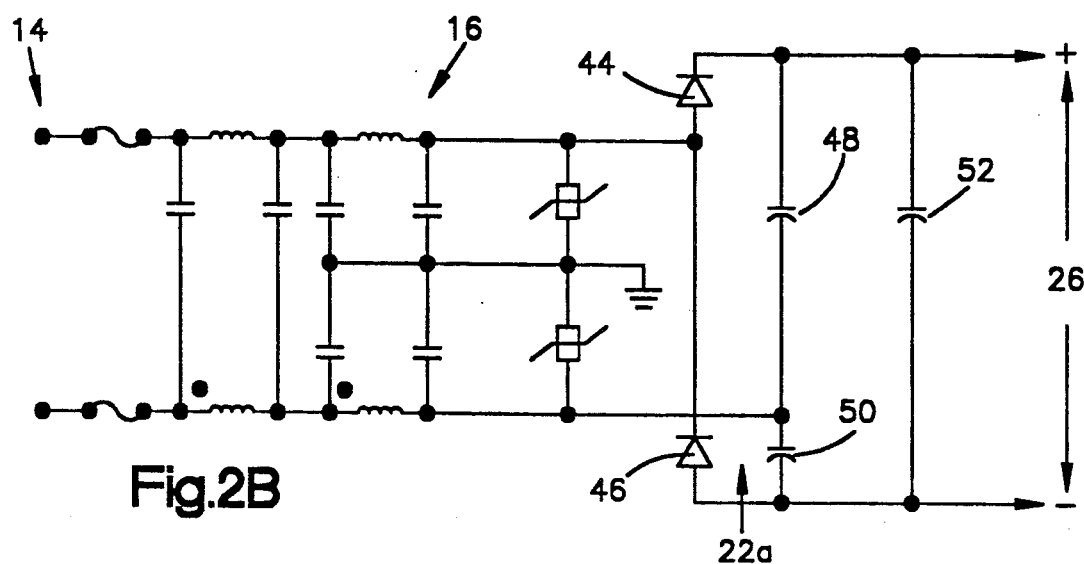
FIG. 2B is an alternate schematic of a rectifier circuit for producing a DC output from an AC input.

FIGS. 2A and 2B depict alternate circuits for converting the AC input 14 into the DC output 26. The circuit of FIG. 2B is designed to accommodate input voltages of approximately 110 volts AC. The AC input 14 passes through the EMI filter 16 and a 4.6 millihenry inductor which provides a power factor correction.

A halfwave rectifier 22a is formed from two diodes 44, 46 and two capacitors 48, 50. The halfwave rectifier also acts as a voltage doubler. An output from the halfwave rectifier is coupled to a filtering capacitor 52 and the voltage across the capacitor 52 constitutes the high voltage DC output 26.

The circuit of FIG. 2A accommodates an input 14 of 220 volts alternating current. A full wave rectifier 22b includes four diodes 54a-d that produce an output transmitted through a power correction factor circuit 55 to an output filter capacitor 56. The output 26 from the circuits depicted in FIGS. 2A, 2B is a relatively ripple free DC signal.

Processing Circuit

Figure 3:
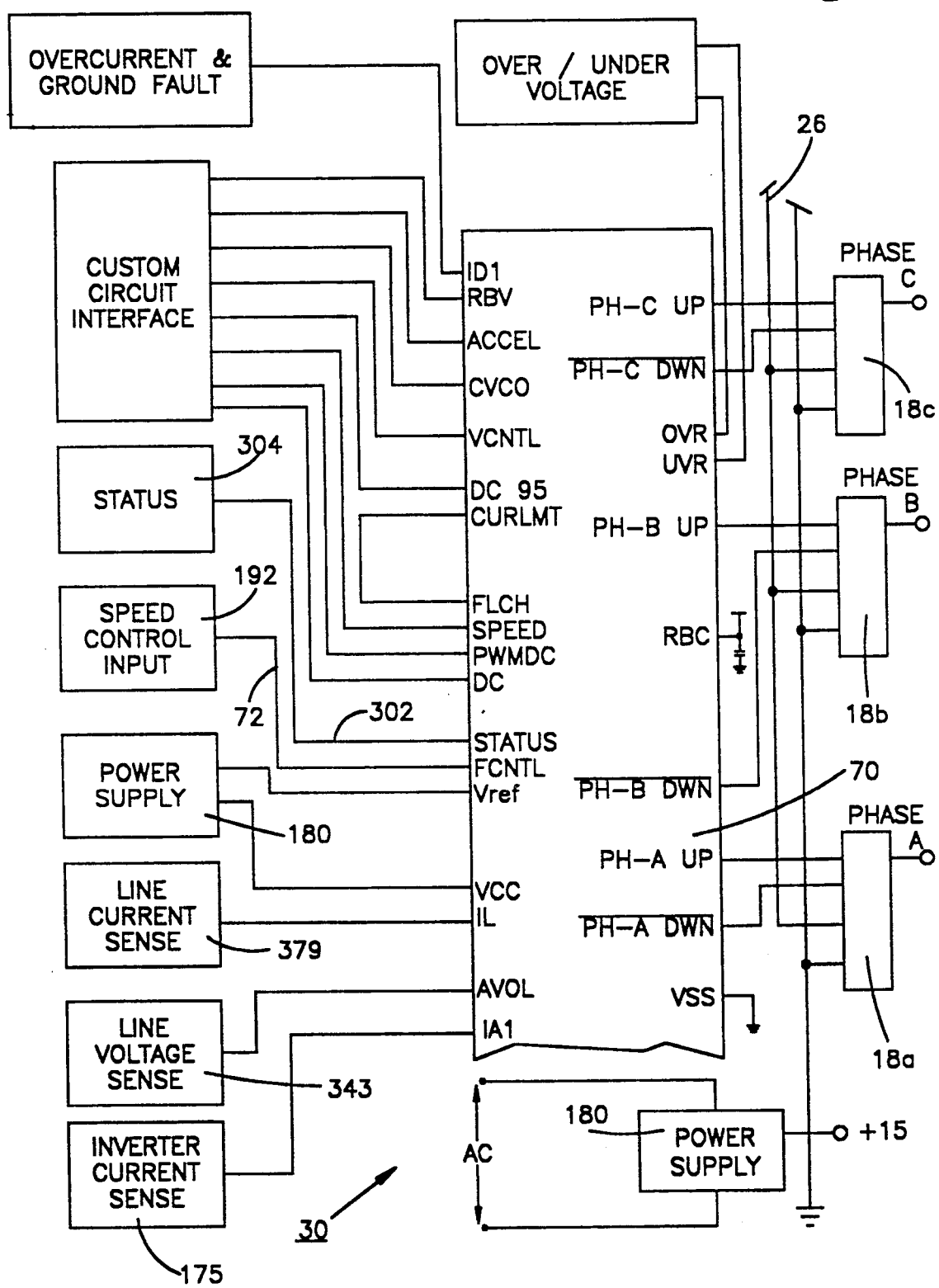
FIG. 3 is a schematic which includes a custom integrated circuit for dictating motor speed based on a pulse width modulated control input.

A block diagram of the processing circuit 30 is depicted in FIG. 3. The circuit 30 includes a custom integrated circuit 70 that responds to a speed control signal at an input 72 and generates control signals for activating switches in three inverter control circuits 18a, 18b, 18c, coupled to the three phase windings of the motor 12.

Each of the invertor circuits 18a, 18b, 18c is coupled to a high voltage DC output 26 from the rectifier 22. Selective activation of switching transistors causes the DC signal to be coupled across a selected motor winding.

Inverter Circuits

Figure 4:
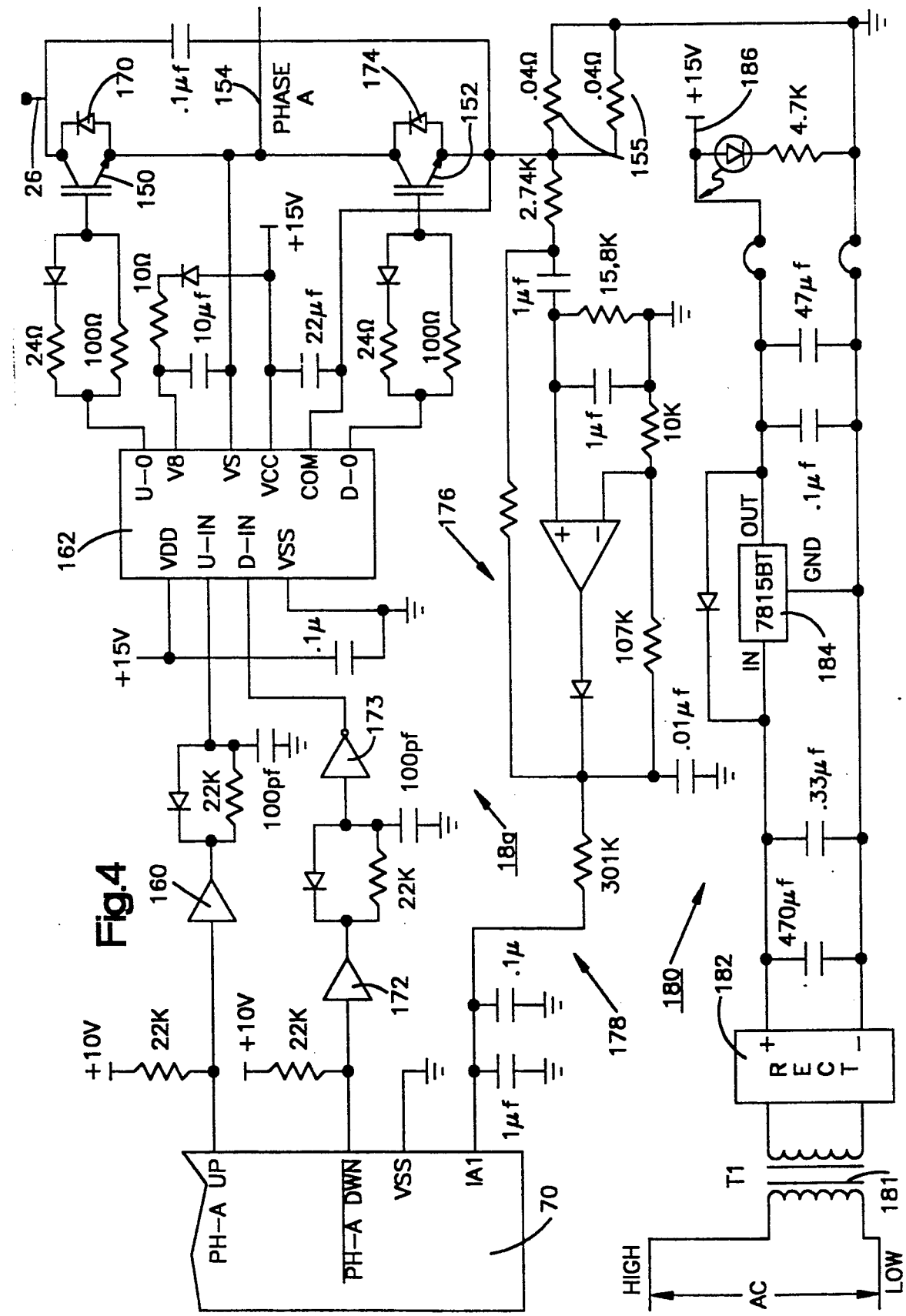
FIG. 4 is a detailed schematic of a power supply, one stage of a three stage inverter circuit for coupling the DC output from the rectifier circuits of FIGS. 2A and 2B across compressor motor windings and a circuit for sensing current through the invertor circuit.

FIG. 4 illustrates a detailed schematic of the inverter circuit 18a for activating a phase A winding of the motor 12. The output pin designated PH-A UP from the circuit 70 controls the conductive state of a first transistor 150 and the pin designated $\overline{\text{PH-A DOWN}}$ controls the conductive state of a second transistor 152. Each of the transistors 150, 152 is an IGBT transistor characterized by rapid switching speeds. By regulating the gate voltage on these two transistors, the custom circuit 70 controls the voltage at an output 154 coupled to the phase A winding of the motor 12.

The emitter of the transistor 152 is coupled to ground through a parallel combination of two output current sensing resistors 155. The emitter of the transistor 150 is coupled to the collector of the transistor 152 and therefore floats above ground. The output 154 can be grounded by turning on the transistor 152 while the transistor 150 is turned off. The output 154 can be coupled to the high voltage output 26 from the rectifier 22 by turning on the transistor 150 and turning the transistor 152 off.

The signal output at the pin designated PH-A UP is coupled to a buffer amplifier 160 having an output coupled to a level translating circuit 162 that electrically isolates the low voltage output of the circuit 70 from the high voltage of the transistor 150. A diode 170 coupled across the emitter and collector of the transistor 150 protects the transistor from potentially damaging overvoltages by providing a reactive current path when the transistor 150 is turned off.

The signal labelled $\overline{\text{PH-A DWN}}$ from the custom circuit 70 is coupled through two buffer amplifiers 172, 173. An output from the amplifier 173 is transmitted to a gate input of the transistor 152 through the level translating circuit 162. The transistor 152 is protected from overvoltages by the diode 174.

An inverter current sense circuit 175 monitors the voltage across the two sensing resistors 155. A voltage across these resistors is filtered by a bandpass filter 176 and then filtered by low pass filter 178 to develop a DC signal at an input IA1 of the custom integrated circuit 70 proportional to an RMS value of inverter current.

The circuits 18b, 18c are similarly constructed (except for the inverter current sense circuit) and apply phase B and phase C energization signals to the windings of the three phase motor 12. The motor energization scheme that is implemented applies a sinusoidally varying signal across each winding of the three phase motor. The signal across a given winding is phase shifted by 120° with respect to an adjacent winding.

Power Supply

A low voltage power supply 180 is also shown in FIG. 4. The power supply 180 receives the alternating current input 14 that is stepped down by a transformer 181 and rectified by a rectifier 182. The output of the rectifier 182 is filtered and coupled to a voltage regulator 184 that generates a regulated 15 volt output 186. The 15 volt output from the power supply is coupled to a voltage regulator 187 (FIG. 5C) that provides a 10 volt output 188 connected to a power supply pin VCC of the circuit 70. A temperature stable zener diode 189 (FIG. 5C) provides an 8 volt reference voltage VREF at an input to the custom integrated circuit 70 through an operational amplifier 312.

Speed Control

In accordance with the disclosed embodiment of the invention, the motor's target rotation speed is based on calculations performed by a controller (not shown) external to the circuit 30. The controller provides a pulse width modulated control signal based upon sensed conditions such as a sensed difference between a set point temperature and a sensed temperature.

The signal corresponding to target motor speed is presented at the input 72. It is an on/off or pulsing signal having a fixed frequency and a variable duty cycle. In the preferred design the duty cycle is varied by the external controller in a range of between 5 and 95%. A conversion between the duty cycle of this signal and target motor speed is performed by the custom circuit 70 so that as the duty cycle varies between the 5 and 95% the rotational speed of the motor 12 varies between 30 and 120 hertz. The input 34 from the external controller (FIG. 5C) is coupled to the input 72 by an optically isolating speed control input circuit 192. As the signal at the input varies on and off, a LED 193 emits light which turns off and on a switching transistor 194.

The frequency control signal at the input 72 is coupled to a FCNTL pin of the custom circuit 70. Three amplifiers 200, 201, 202 (FIG. 6C) convert the pulse width modulation signal at the input 72 into a direct current signal designated PWMDC.

The PWMDC output pin from the custom integrated circuit 70 couples this DC signal through a circuit 205 (FIG. 5C) to a SPEED input pin of the custom circuit 70. This routing of the PWMDC signal from the circuit 70 allows the PWMDC signal to be scaled and level shifted as discussed below.

The signal at the SPEED input pin (FIG. 6C) is coupled to an ACCEL output pin through an amplifier 210. At steady state, the signals at the SPEED input and the ACCEL output pin are the same.

At motor start up and in response to sudden changes in the speed control input, it is necessary that the motor speed reach the target speed gradually. The combination of a resistor 211 (FIG. 6C) and capacitor 212 (FIG. 5C) cause the voltage at the ACCEL output to change gradually when the SPEED input rapidly changes.

At the junction 213 (FIG. 5C) the DC signal at the ACCEL output corresponding to target speed branches to two operational amplifiers 214, 215. The first amplifier 214 is coupled to an RBV input pin to the circuit 70. As seen in FIG. 6F this signal is coupled to a current controlled oscillator 220.

The current controlled oscillator 220 receives this DC signal at an input 221 and generates a number of signals whose frequency varies with the size of the DC input 221. One step in generating a control signal corresponding to motor speed is to generate a triangle wave having a controlled frequency at an output 224 (FIG. 6F). The current control oscillator 220 charges and discharges a capacitor 222 (FIG. 5C) coupled to the CVCO pin to generate a triangle shaped wave form.

The second amplifier 215 (FIG. 5C) outputs a signal to a VCNTL input pin of the custom circuit 70. This signal is scaled to produce an output 230 labelled $V_c+$ (FIG. 6D). The current controlled oscillator 220 triangle wave output also produces a clock signal 231 at an output from a flip flop 232 (FIG. 6F).

Figure 7B:
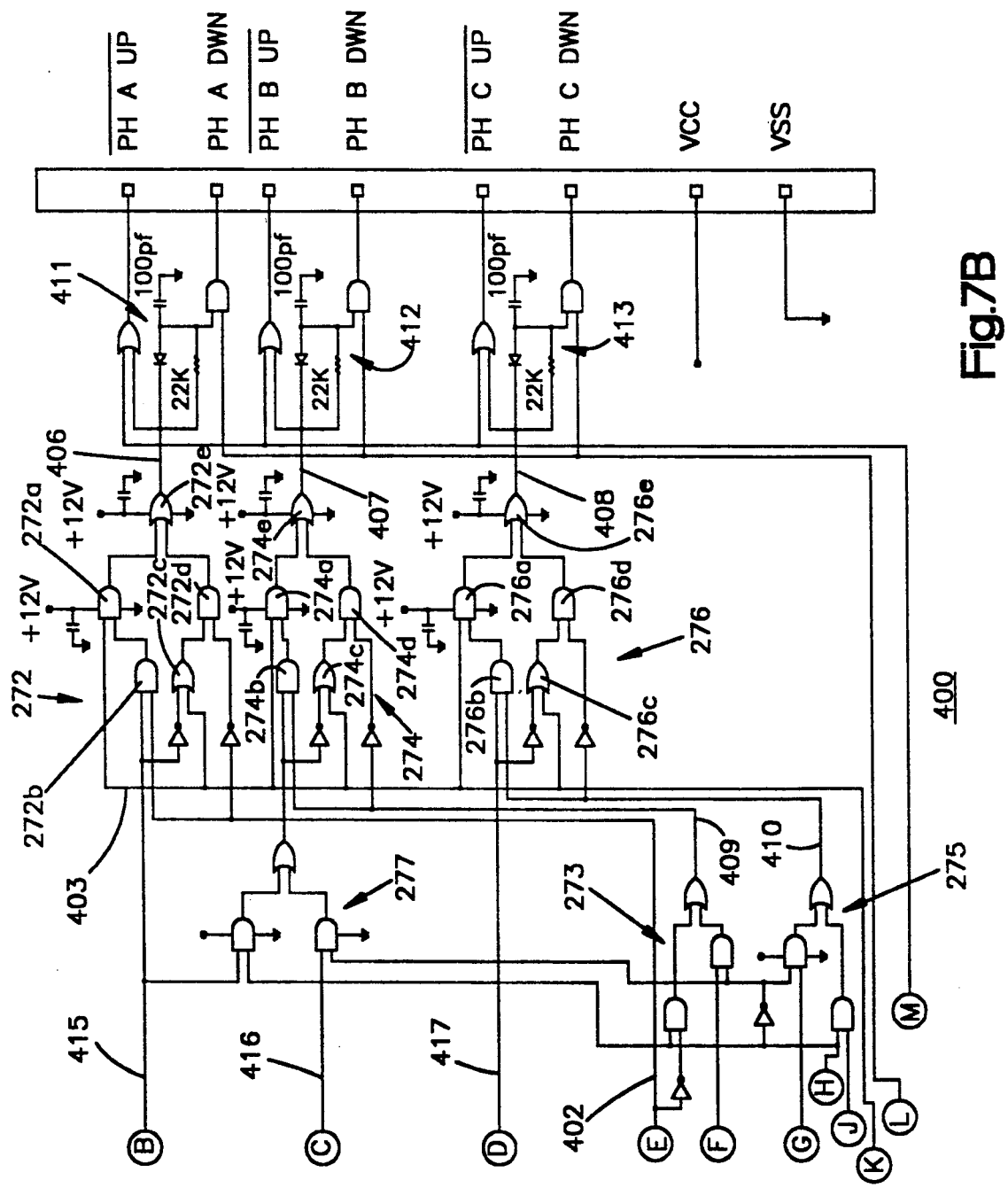

The TRI, CLK, $V_c+$ and $V_c-$ outputs from the current control oscillator 220 are coupled to a pulse width modulation circuit 250 depicted in detail in FIGS. 7A and 7B. This circuit 250 generates six motor winding energization signals coupled to the inverter circuits 18a, 18b, 18c.

An additional input 300 connected to the pulse width modulation circuit 250 and labelled STOP in FIG. 7A causes the circuit 250 to stop generating the phase control signals coupled to the inverter circuits. This signal is derived from logic circuitry implemented within the custom circuit 70 and which is described below.

Pulse Width Modulation

FIGS. 7A and 7B depict one implementation of the pulse width modulation circuit 250. Along the left hand portion of FIG. 7A the triangle wave signal TRI, clock signal CLK, and stop signal STOP are coupled to digital circuitry for producing six phase output signals designated at the right of FIG. 7B.

The signals $V_c+$, $V_c-$ are coupled across a resistance network 252 used in generating control voltages coupled to the inverting input (−) of three comparator amplifiers 254, 255, 256.

The clock signal CLK is coupled to a counter 260 which functions as a 0-11 counter. Four outputs 260a-260d represent 13 different states of the counter (FIG. 9). The counter 260 has twelve outputs so it can function as a 0-4095 counter. The output 260a is coupled to the counter's 4th output pin so the output 260a changes state for every 8 pulses of the CLK signal. As seen in FIG. 7A when the two outputs 260c, 260d are high, an AND gate 262 generates a high output which is coupled to an OR gate 264 having its output coupled to the reset input RST of the counter 260. Thus, each time the counter 260 reaches a count of 12, a reset signal is received by the counter and the counter output goes to all zeros.

The four outputs 260a-260d from the counter constitute control signals that are coupled to three analog multiplexers 266-268. The multiplexers couple a voltage signal at one of 13 multiplexer inputs to an output based upon the state of the control signals 260a-260d. The 13 inputs to each multiplexer are derived from signals at junctions on the resistance network 252 energized by the $V_c+$ and $V_c-$ signals.

An output 266a from the first analog multiplexer 266 is coupled to the comparator 254 and generates signals used in deriving phase A output signals for activating the two switching transistors 150, 152 in the inverter circuit 18a. The analog multiplexer 267 provides an output 267a to the comparator 255 that generates signals used in deriving phase B winding energization signals. Similarly, the analog multiplexer 268 provides an output 268a to the comparator 256 that generates signals used in deriving the phase C energization signals.

Figure 9A:
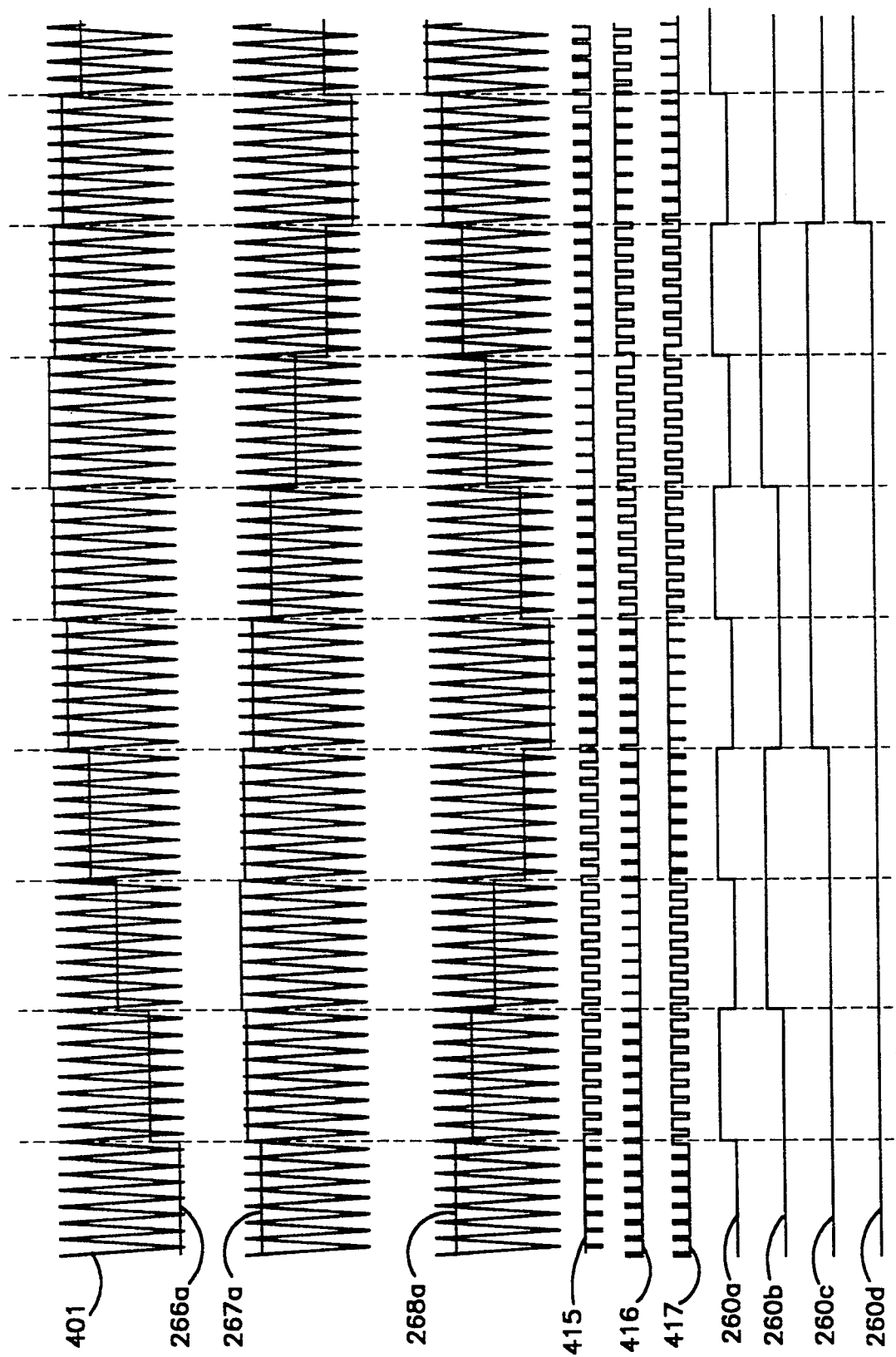
FIGS. 9A and 9B depict a series of time varying voltage wave forms at different junctions of the custom integrated circuit.

FIG. 9A depicts signals at the multiplexer outputs 266a, 267a and 268a as a function of time. The series of stair step waveforms are coupled to the inverting input of comparators 254-256. The height of each step is sinusoidally weighted and the specific value can be calculated from the resistance values in the array 252 (See FIG. 8).

The triangle wave output TRI (401 in FIG. 9A) is synchronized with the clock pulses CLK and coupled to the non-inverting input to the comparators 254-256. The series of stair step waveforms superimposed on the triangle waveforms in FIG. 9A are the outputs from the multiplexers 266, 267, 268. The first interval at the left corresponds to an output of zero (all four bits low on the outputs 260a-260d) from the counter 260.

Figure 9B:
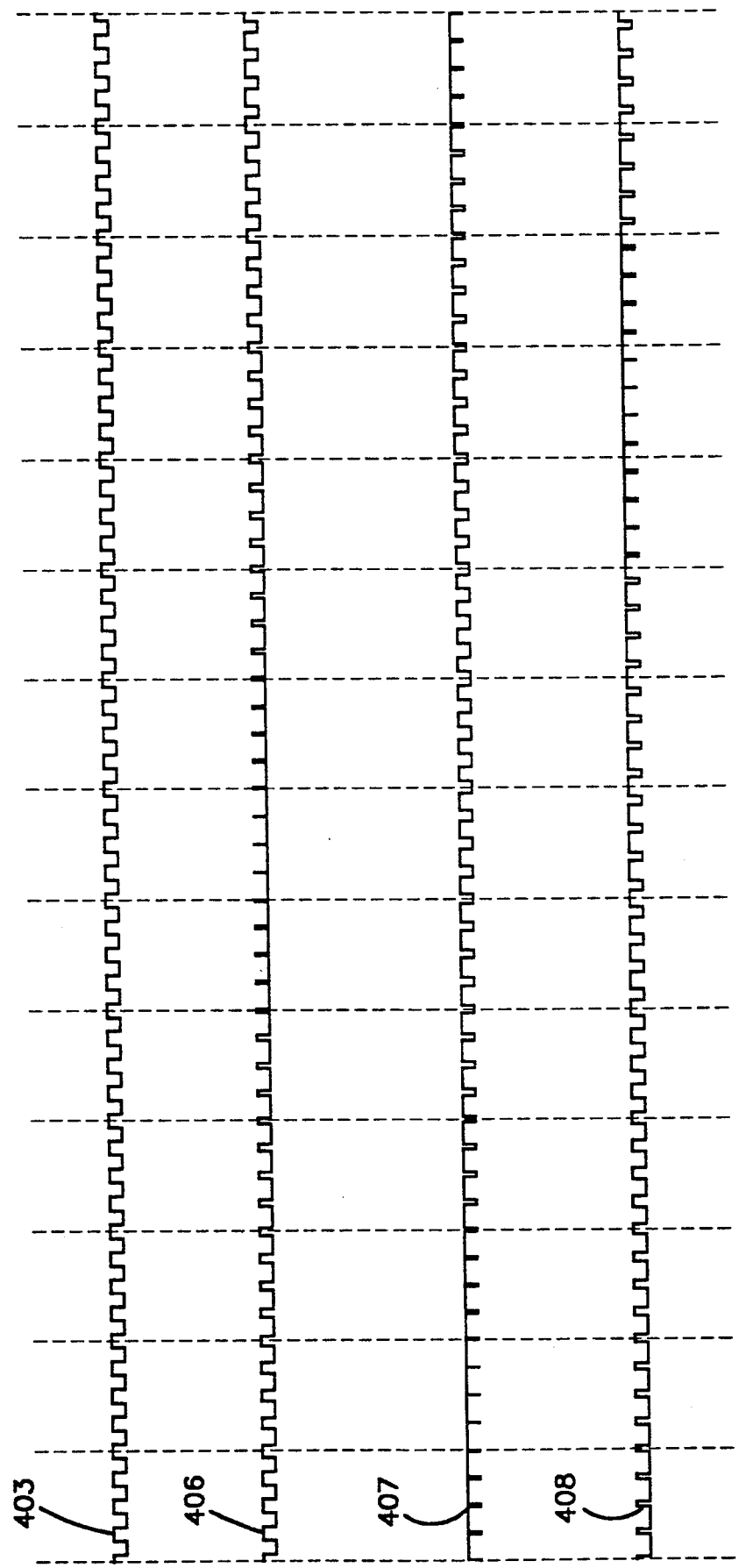

The comparators 254, 255, 256 compare the superimposed waveforms and generate outputs 415, 416 and 417 (See FIG. 9A) which are fed to a logic circuit 400 (Fig 7B). The actual switching pulses for PH-A transistors are developed at an output 406 through the logic circuit 400 as shown in timing waveforms of FIG. 9B. Similarly. PH-B and PH-C switching pulses are developed at junctions 407 and 408 respectively. A pulse blanking network 411 separates the upper and lower transistor switching pulses for PH-A. The pulse blanking networks 412, 413 for PH-B and PH-C are also shown in FIG. 7B. At any given time the pulse switching waveform of a PH-A leads that of PH-B by 120 degrees and lags that of PH-C by 120 degrees as seen in FIG. 9B.

The phase delays for the three phases are implemented by a series of six cascaded D type flip-flops within a circuit 270. The Q0, Q2 and Q4 outputs from this circuit 270 are used in a three-phase embodiment of the present invention. The circuit is clocked by low to high transistions of the output 260a from the counter 260.

The comparators 254, 255 and 256 generate the positive half cycle of the sinusoidally pulse width modulated signal. The circuit 270 and three combinational logic circuits 272, 274 and 276 coupled to outputs from the circuit 270 "invert" the signals from the comparators after 180 degrees to produce the second half of the 360 degree cycle.

The counter 270 generates a square wave signal 270a having a frequency equal to the fundamental frequency of the pulse width modulated signals 415, 416 and 417. Similarly, signals 270b and 270c are generated but with 120 degrees phase lag with respect to one another. The signal 270d is also a square wave signal but lags the signal 270a by 90 degrees to be used for two-phase motor drive application. When a phase signal 322 is tied to low level, a signal 409 (see 7B) is equal to signal 270b and a signal 410 equals signal 270c and the circuit runs as a three-phase motor drive. By tieing the phase signal 322 to a high level, the signal 490 would be 180° out of phase with signal 270a and the signal 410 equals signal 270d (90 degrees out of phase). Two combinational logic circuits 273 and 275 perform the selection between the two- and three-phase operation as described above.

Figure 7C:
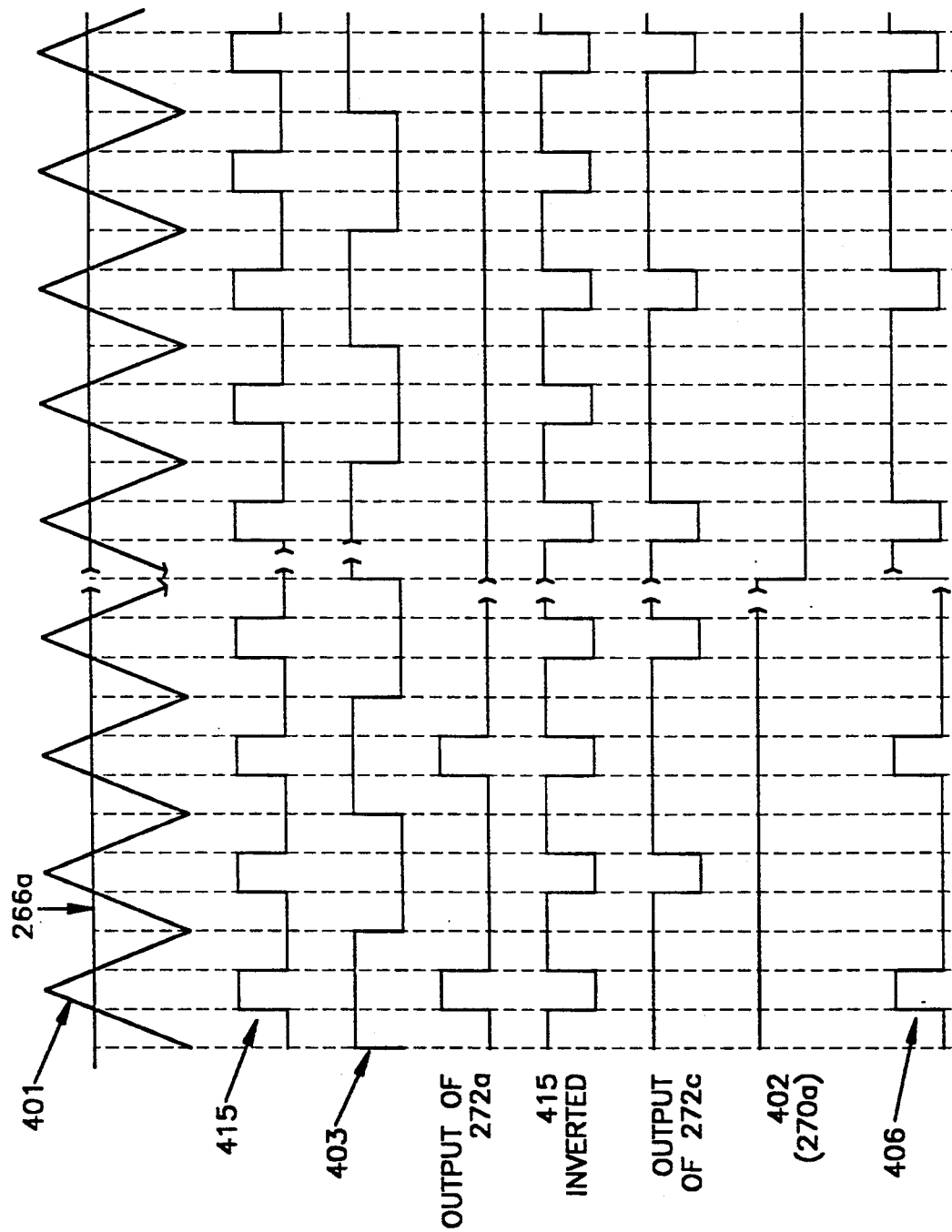
FIG. 7C depicts a series of waveforms for simulating a sinusoidal output from the inverter.

A square wave signal 403 synchronizes the pulse width modulated signals as described below and shown in FIG. 7C. During the positive half cycle of phase A, the signal 402 (270a) is HIGH and the pulse signal 415 passes through AND gate 272b and synchronized with signal 403 through AND gate 272a. The signal out of the AND gate 272d is LOW during this period and positive half cycle pulses pass through an OR gate 272e at 406 as shown in FIG. 7C. During the negative half cycle of phase A, the signal 402 is LOW and the output signal of AND gate 272a is LOW. The pulse signal 415 is inverted, however, and OR gated with synchronizing signal 403. The output signal of OR gate 272c constitutes the phase A pulse width modulated signals during the negative half cycle which is then AND gated with inverted signal 402 at 272d. The negative half cycle pulses are then OR gated with the output signal of AND gate 272a through OR gate 272e as shown in FIG. 7C. The pulses at 406 constitute sinusoidally modulated pulses for phase A over the entire cycle. The pulse width modulated signals at 407 and 408 are similarly developed but with fundamental frequency component being 120° (180° for two phase) and 240 degrees (90 degrees for two phase) phase shifted respectively.

The comparator output signal 416 is fed to combinational logic 274 through a circuit 277. The PHASE signal 322 selects between pulses 416 (for three-phase mode) and 415 (for two-phase mode) to be fed into the logic circuit 274.

The circuit 250 is designed to be flexible enough for use in controlling the operation of different type multiphase motors. Specifically, the custom integrated circuit 70 can be used with either a three-phase or a two-phase motor. A phase input 322 indicates whether a three-phase or two-phase motor is being operated. In the illustrated embodiment of the invention, the phase input 322 activates a switch 323 which adjusts the timing of the output 417.

Fault Sensing Circuitry

Figure 5A:
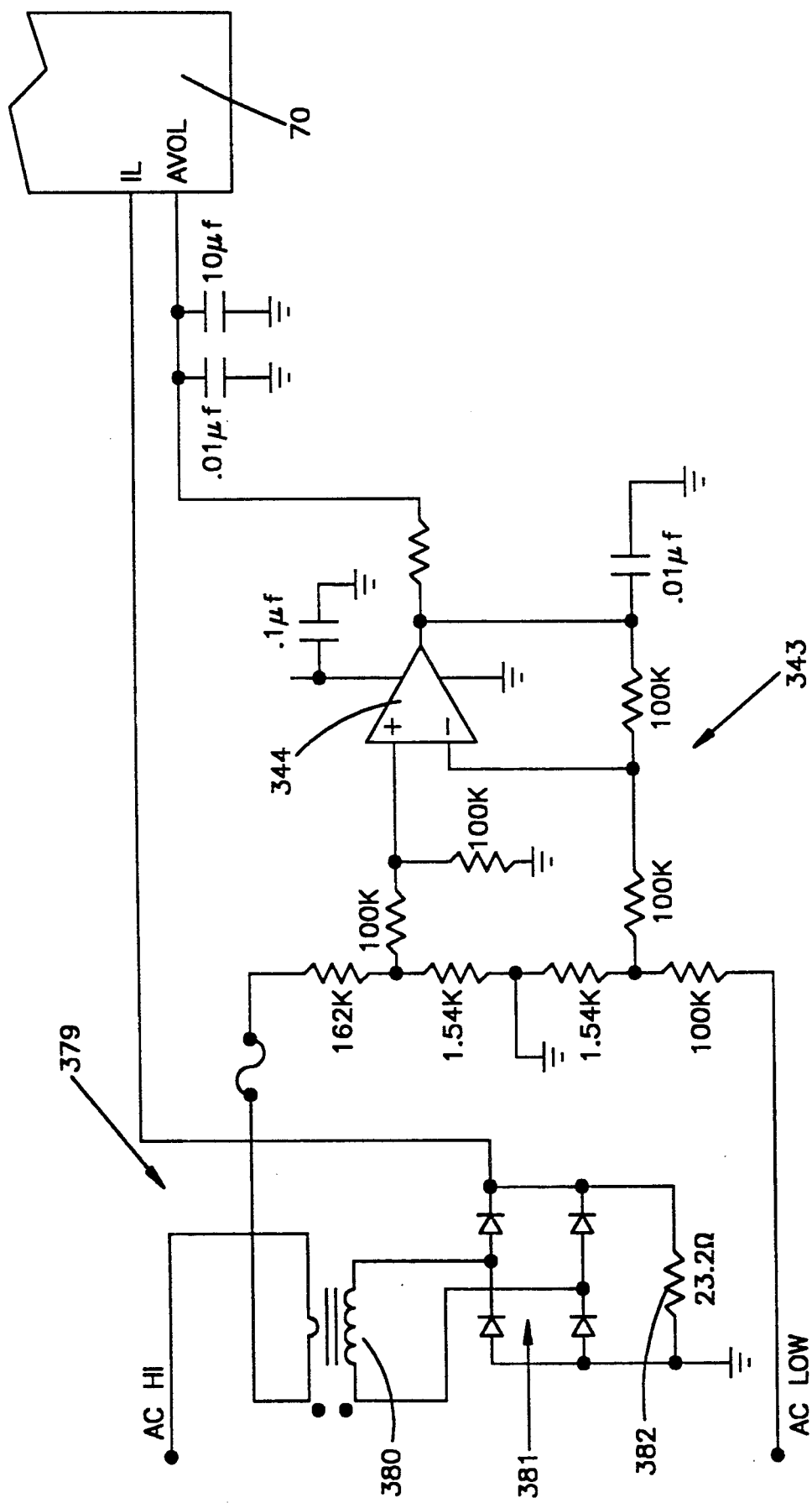
FIGS. 5A–5C are detailed schematics of interface circuits coupled to the custom integrated circuit depicted in FIG. 3.
Figure 5B:
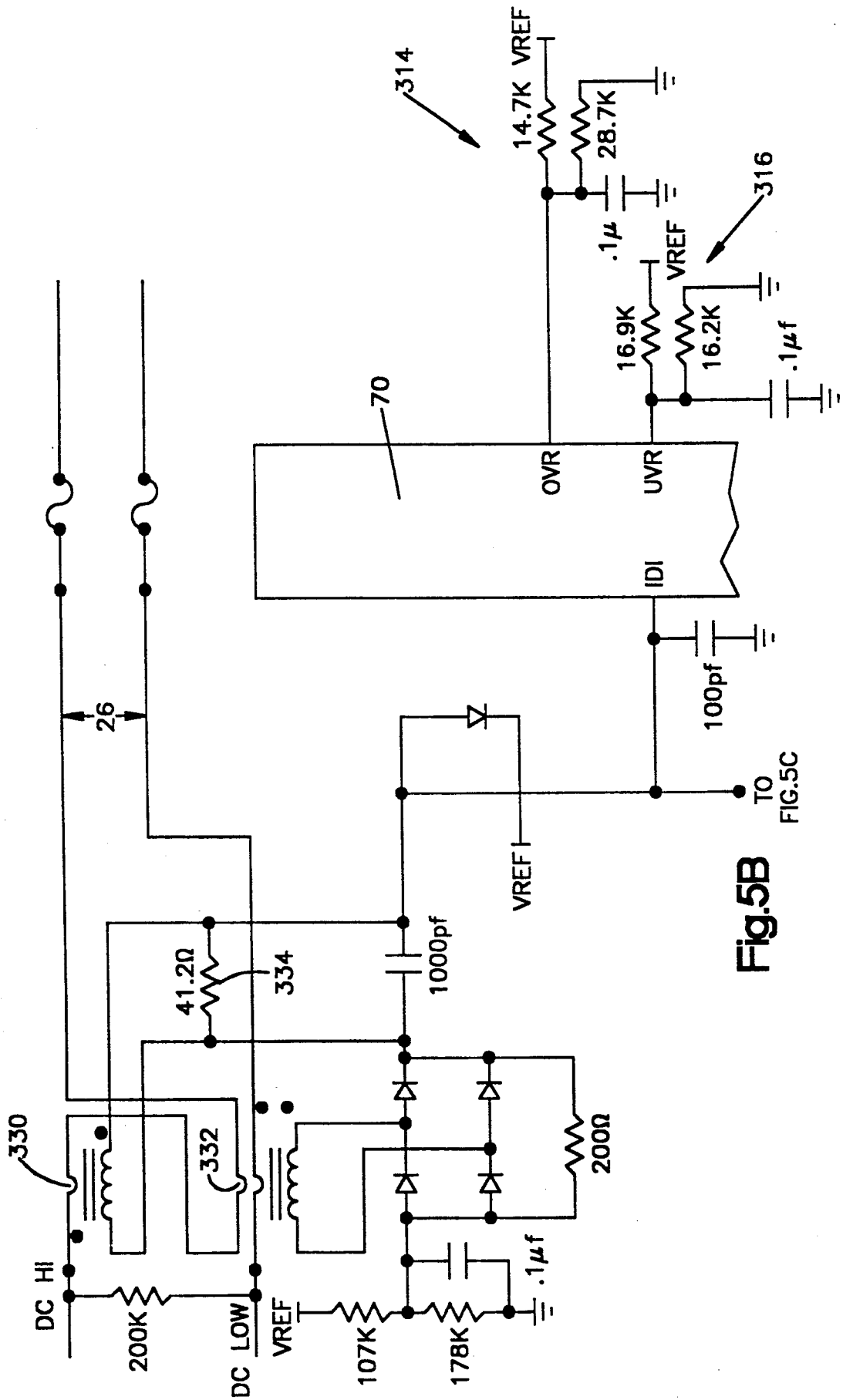
Figure 5C:
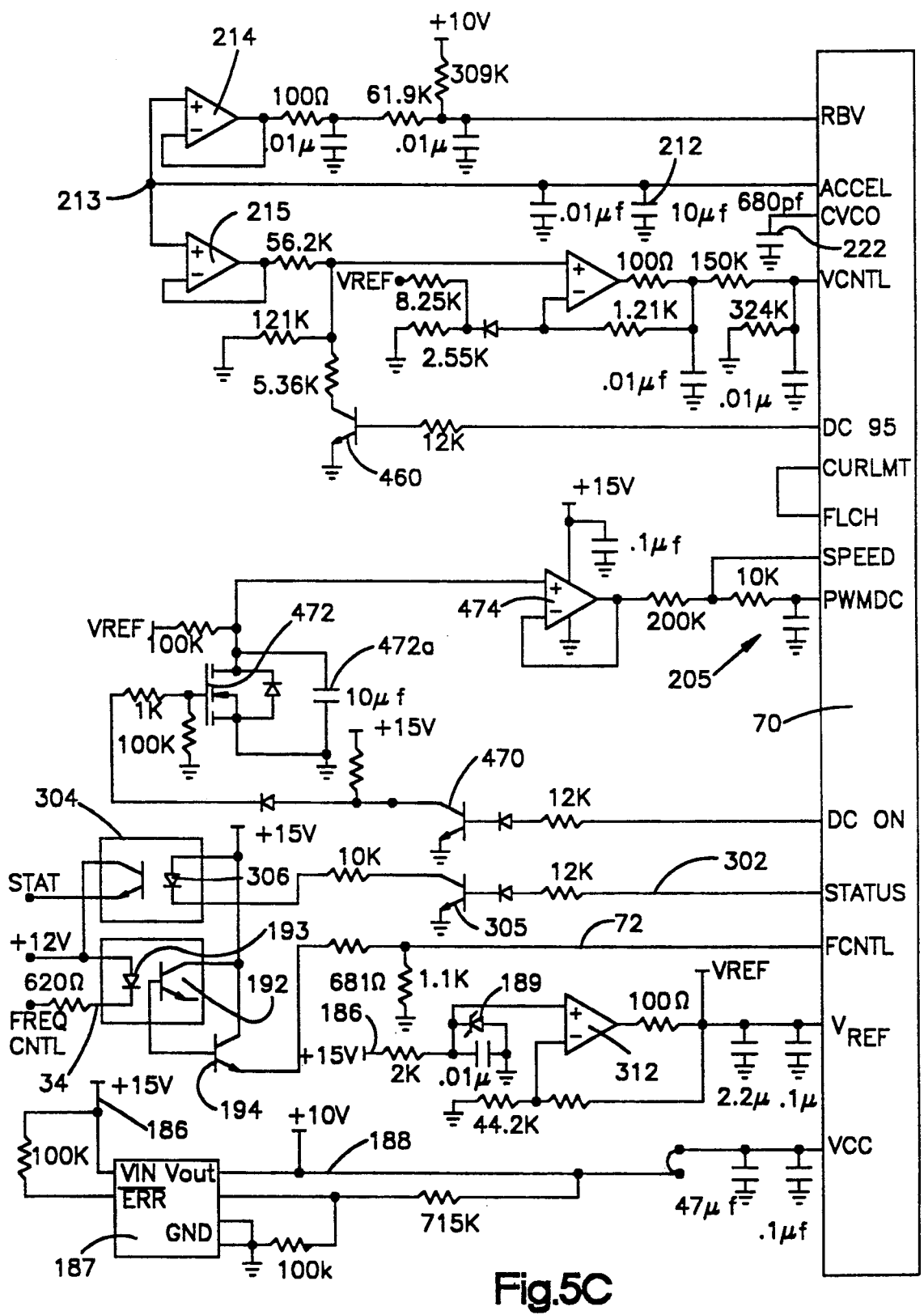

FIGS. 5A-5C illustrate connections to the circuit 70 for monitoring status conditions other than the frequency control input signal 72. Some of these monitored conditions are used to shut down the motor 12. Such a shut down is caused by generating a high signal on a STOP output 300 (See FIGS. 6E and 7A).

The custom integrated circuit 70 also provides a status output 302 which is coupled to a status interface circuit 304. If a fault condition is sensed, the output 302 goes low. If the output 302 goes low, a transistor 305 is turned off and a light emitting diode 306 rendered nonconductive. This causes an output from the circuit 304 to go low. This signal is coupled to the source (not shown) of the speed control input 72. This source checks the status output before and after sending speed control signals and de-activates the transmission of speed control signals in the event the status signal suddenly goes low.

The $V_{REF}$ signal of 8 volts is coupled to two voltage dividers 314, 316 (FIG. 5B) having inputs coupled to OVR and UVR pins of the custom integrated circuit 70. The signals at these two inputs are reference signals for use in providing an indication concerning overvoltage and undervoltage.

Figure 6A:
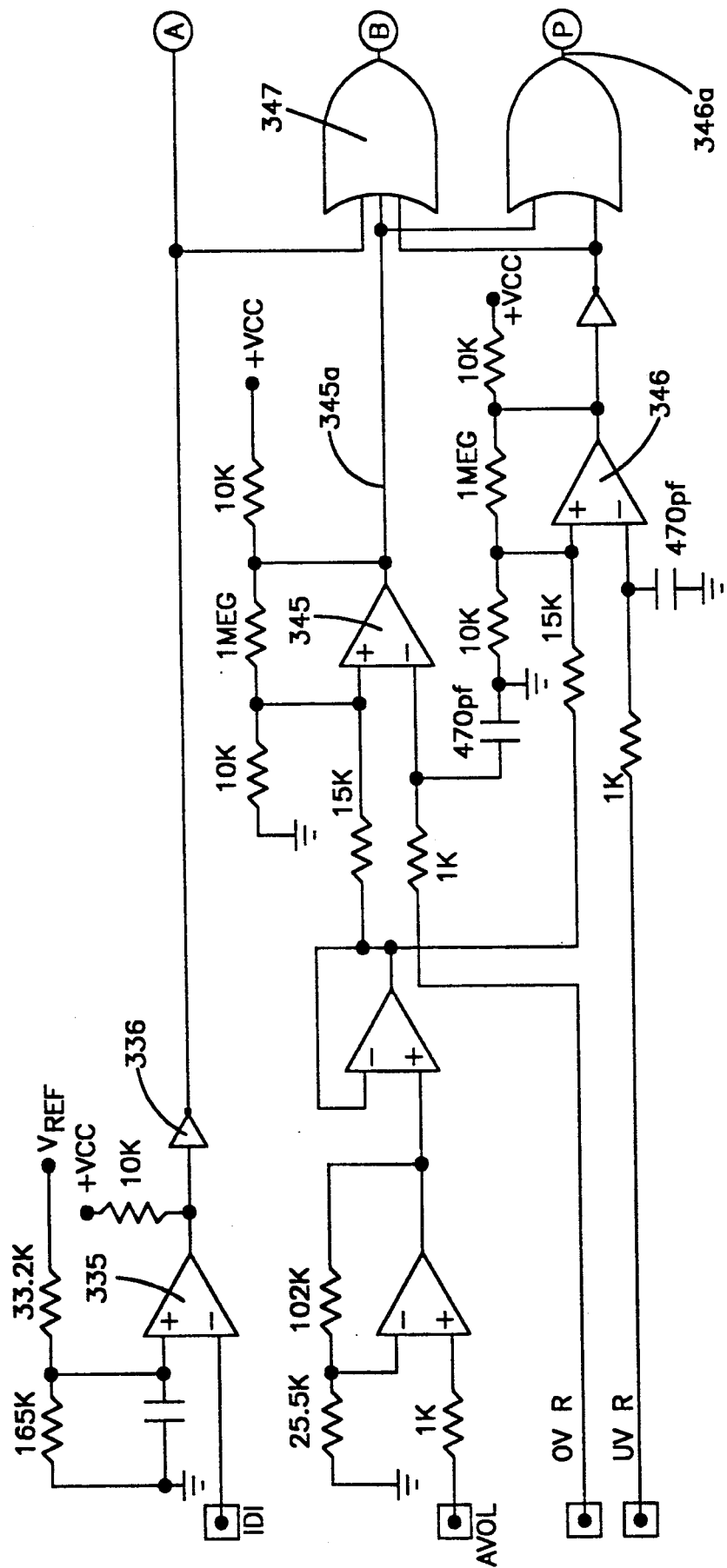
FIGS. 6A–6F are detailed schematics of an input portion of the custom integrated circuit of FIG. 3.

A line voltage sensing circuit 343 (FIG. 5A) monitors AC voltage provided at the input 14. A differential amplifier 344 generates a DC output that is coupled to the circuit 70 at an input pin "AVOL" to provide an indication when the alternating current input voltage exceeds the "OVR" reference or is below "UVR" reference. As seen in FIG. 6A, the AVOL input signal is evaluated by two comparator amplifiers 345, 346 in the custom integrated circuit 70. If the signal at the noninverting (+) input to the comparator exceeds the OVR input, an overvoltage condition exists and a comparator output 345a goes high. This indication is transmitted through two OR gates 347, 348 (See FIGS. 6A, 6E) to a flip-flop 349 for generation of a stop output signal 300.

The circuit 70 also monitors current in the DC output from the rectifier 22. Two current transformers 330, 332 monitor current in the DC output from the rectifier (FIG. 5B) and develop a voltage across a resistor 334. This voltage is coupled as an input designated ID1 to the circuit 70. If the value of this voltage signal across the resistor 334 increases beyond a threshold limit, it is an indication there is a short circuit across the link voltage or that the rotor of the motor is locked. Turning to FIG. 6A, the IDI pin is coupled to a comparator 335 having an output that goes low when the current exceeds a threshold. An invertor 336 converts this to a high input for the OR gate 347 causing a STOP signal.

A line current sensing circuit 379 shown in FIG. 5A consists of a current transformer 380 which senses the line current and rectifies it through a bridge rectifier 381 to develop a DC signal across a resistor 382 proportional to a RMS value of line current.

Figure 6B:
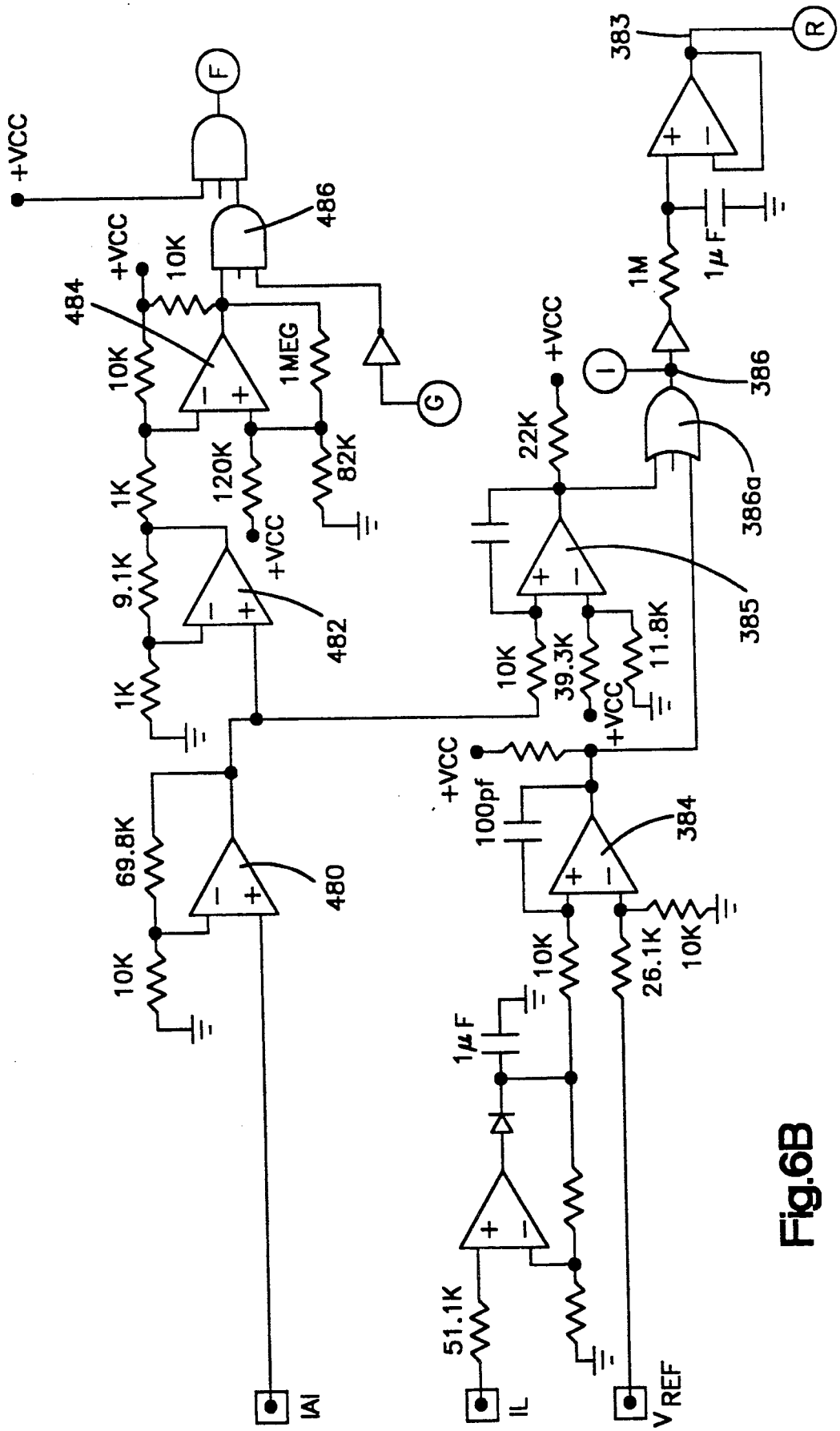
Figure 6C:
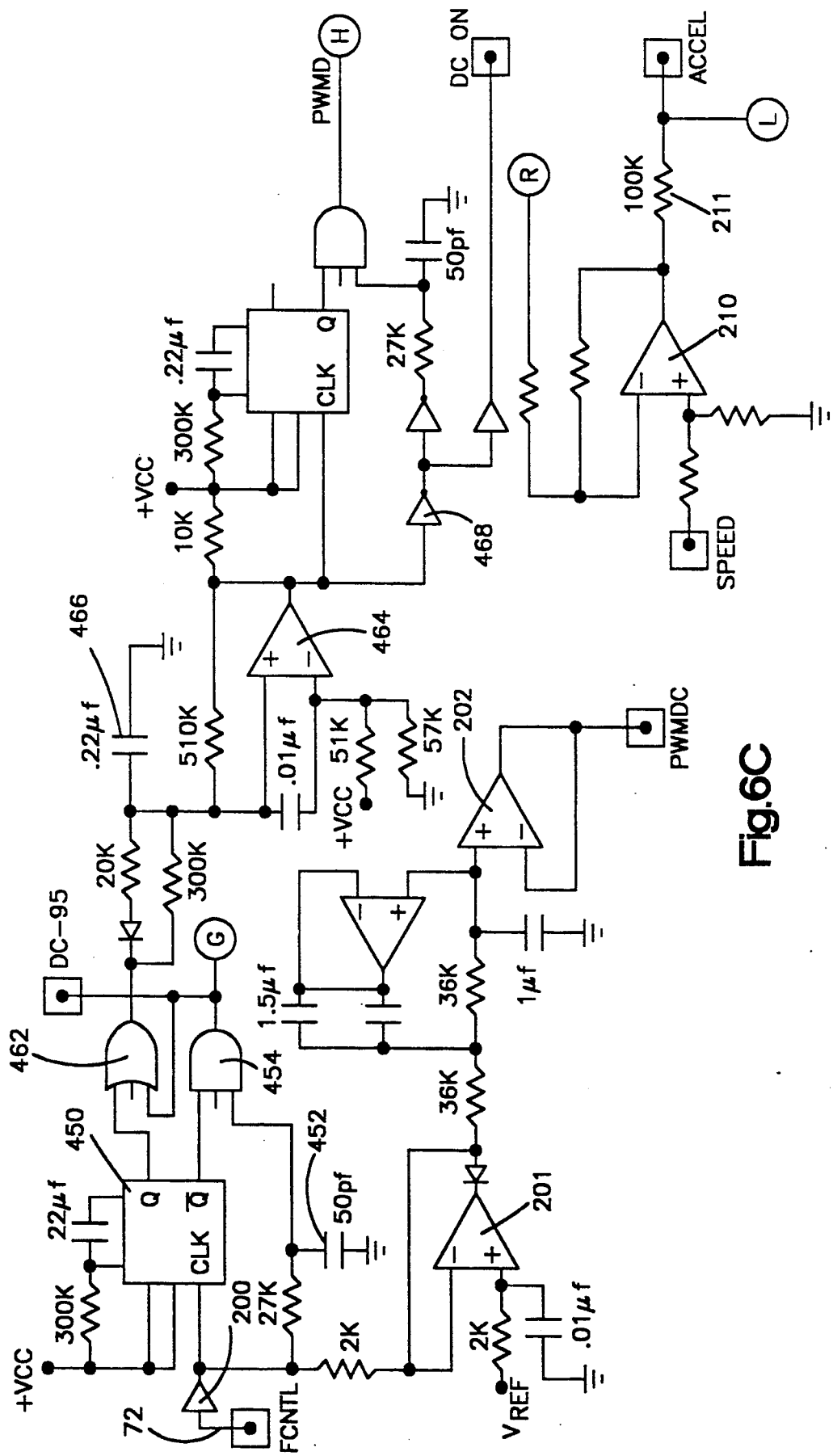
Figure 6D:
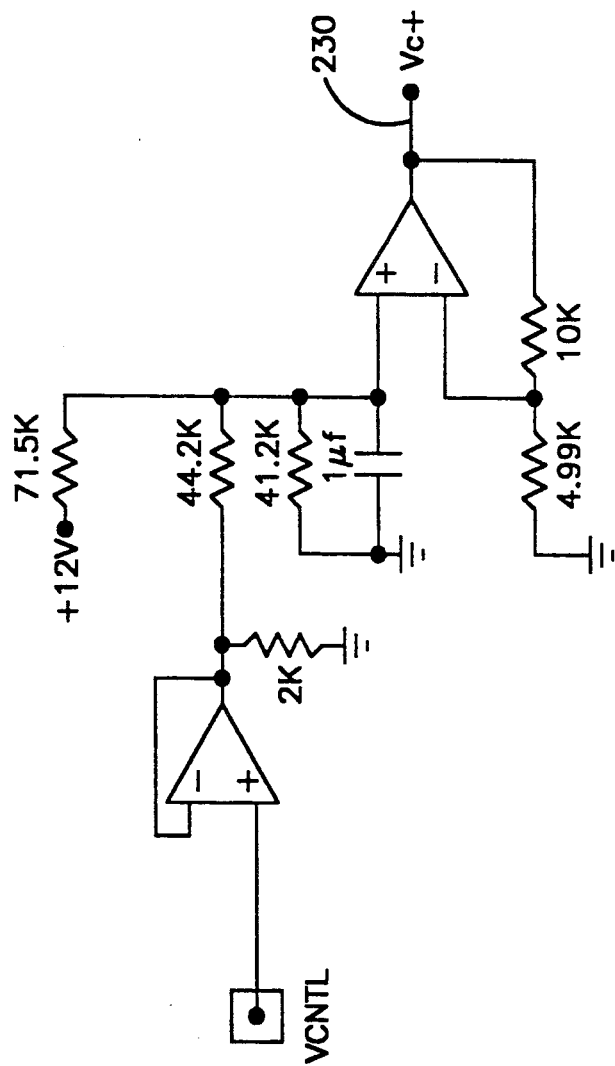
Figure 6E:
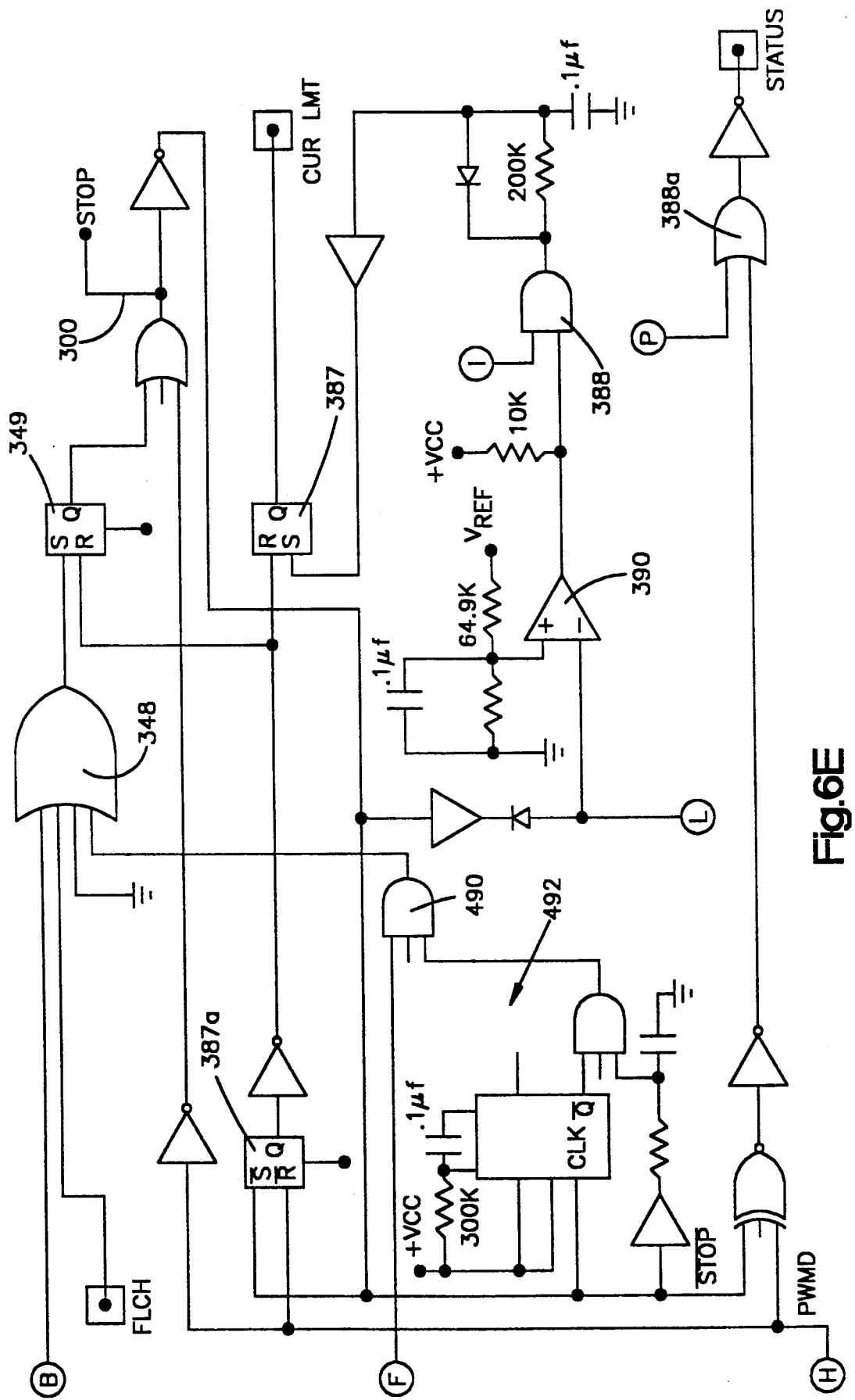
Figure 6F:
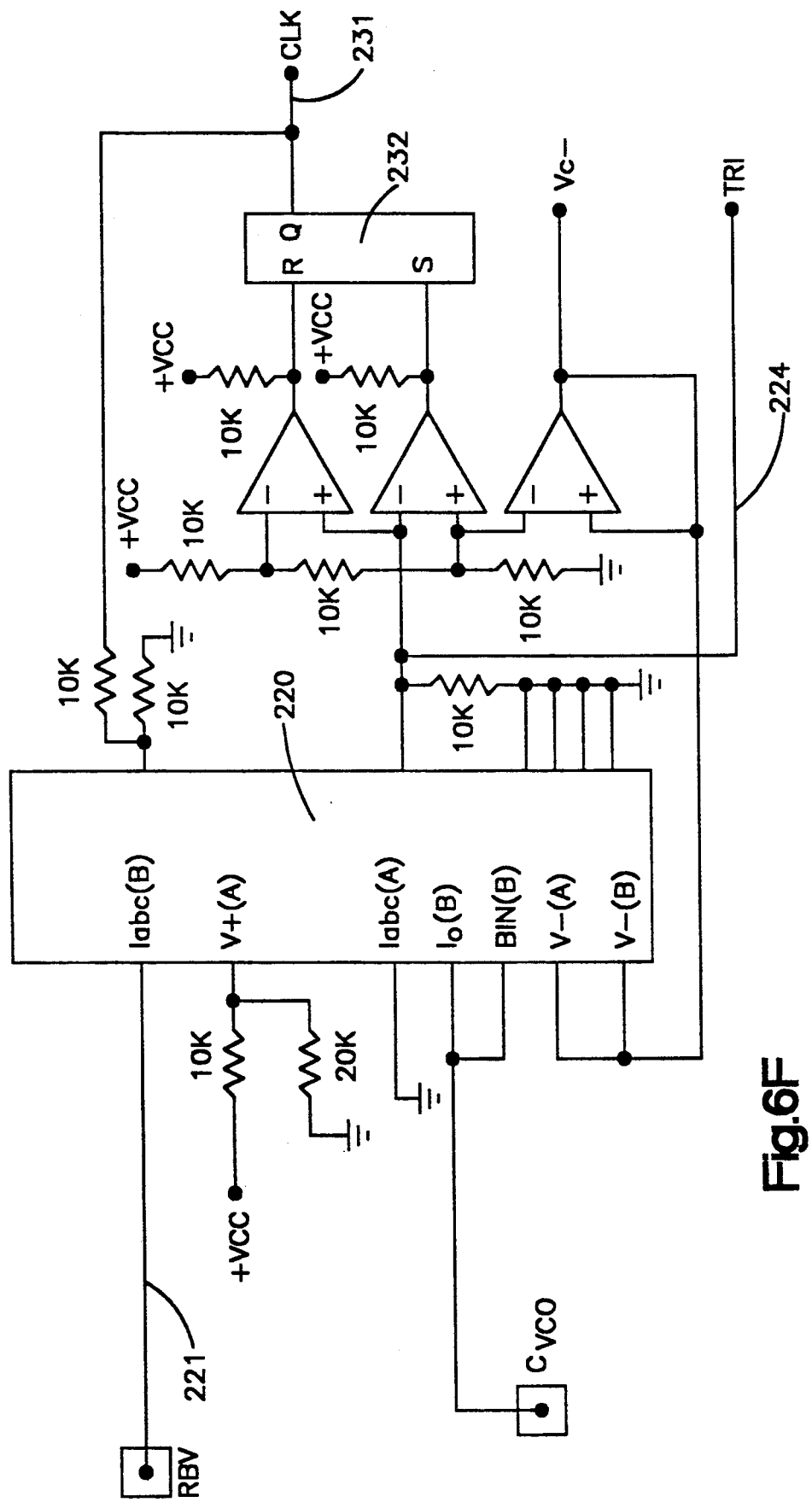

The line current signal is coupled to an input pin IL of the custom integrated circuit 70 and is processed inside the IC as shown in FIG. 6B to develop a signal 383 which is coupled to the inverting input (−) of the amplifier 210 (FIG. 6C). Whenever line current exceeds a specified value set at a comparator 384, the signal coupled to the comparator 210 reduces the motor speed. When this occurs the signal at an output 386 (FIG. 6B) goes high. The ACCEL signal is compared to a minimum frequency level at a comparator 390 (FIG. 6E). Whenever speed is below minimum, the comparator output goes high and is gated at an AND gate 388 with a current limit signal from the OR gate 386a causing a latch 387 to set and bringing a current limit output pin CURLMT of the custom integrated circuit to high level. This pin is tied to an input labeled FLCH of custom IC 70 externally. This input is transmitted through the OR gate 348 thus stopping the switching pulses whenever current reaches too high a level (FIG. 6E) while motor speed is at its minimum.

The inverter current sense signal at IAI (FIG. 6B) is proportional to RMS value of inverter current. This signal is amplified eight times by amplifier 480 and the output is compared with an inverter current limit reference signal at comparator 385. The output of the comparator 385 goes high when the inverter current exceeds the reference level. The comparator 385 output is processed similar to the line current limit signal at the output of comparator 384 through OR gate 386a and causes a reduction in frequency of the inverter or shutdown if motor speed is at its minimum.

As noted previously, the pulse width modulated signal at the input 72 is varied in duty cycle to control motor speed. At duty cycles greater than 95% the motor is de-activated but a signal applied to the motor windings to maintain current through those windings. When the input 72 goes high the control enters a so-called crankcase heat mode.

Turning to FIG. 6C, the FCNTL input clocks a one shot circuit 450. A resistor/capacitor network connected to the one shot is set so that if the duty cycle of FCNTL exceeds 95% both a $\overline{Q}$ output from the one shot 450 and the voltage on a capacitor 452 are high. This causes the output from an AND gate 454 to go high. This high signal is transmitted to the DC-95 pin.

As seen in FIG. 5C the DC-95 pin is coupled to a transistor 460. If the DC-95 pin goes high, the transistor 460 turns on pulling the VCNTL pin low. This input (FIG. 6D) causes an operational amplifier output to go low which in turn causes the $V_c+$ signal 230 to go low.

The high output from the AND gate 454 (FIG. 6C) is coupled to the FIG. 6B circuit to inhibit shut down of the system in the crankcase heat mode. This circuit is discussed below. The output is also coupled to an OR gate 462. When the DC-95 pin goes high, an output from the OR gate 462 goes high causing a comparator amplifier 464 to generate a high signal. Since the OR gate 462 has an input connected to the Q output from the one shot 450, the OR gate 462 also periodically generates a high output when the FCNTL input has a duty cycle between 5 and 95%.. A capacitor 466 keeps the non-inverting (+) input to the comparator 464 high even though the Q output of the one-shot 450 is pulsed. Thus, whenever the system is operating (i.e., the FCNTL input is not zero) the output from the comparator 464 is high.

Figure 7D:
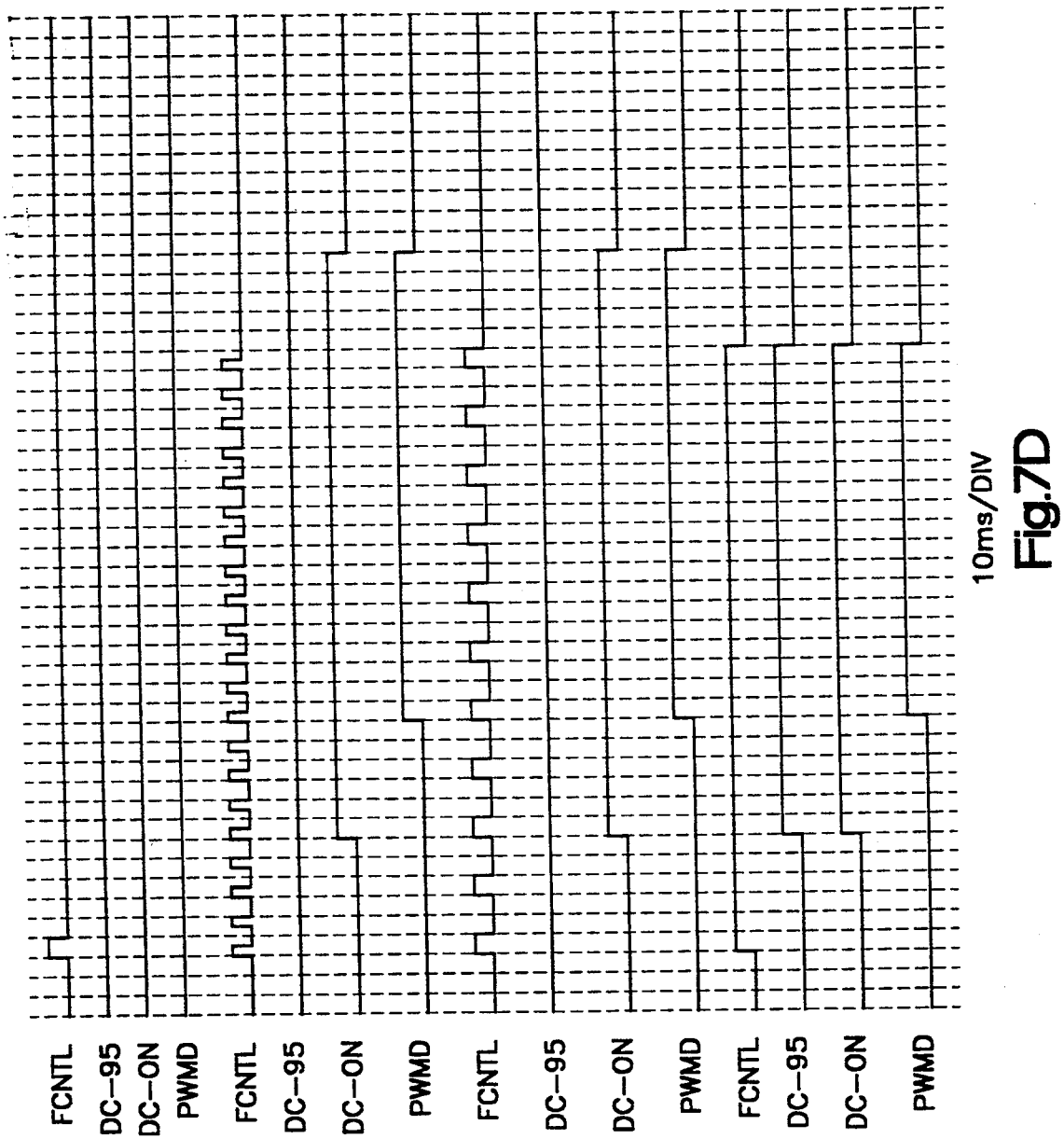
FIG. 7D depicts time varying outputs from the custom integrated circuit.

The high output from the comparator 464 is transmitted through an invertor 468 to a DC-ON output pin from the custom integrated circuit 70. The DC-ON output is at HIGH level when a speed control signal is present. At the START of the speed control signal, there is a delay of about 60 ms before DC-ON goes HIGH (FIG. 7D). A PWMD signal is generated which lags DC-ON by about 60 ms as shown in FIG. 7D. The PWMD signal along with inverted STOP signal develop the STATUS signal as shown in FIG. 6E. The STATUS signal when at HIGH level indicates normal MOPE and when at low level it indicates a fault stop mode. The LOGIC relationship between STATUS, STOP and PWMD is as follows:

| STOP | PWMD | STATUS |
| --- | --- | --- |
| 1 | 0 | 1 |
| 1 | 1 | 0 |
| 0 | 0 | 0 |
| 0 | 1 | 1 |

The STATUS output will also be low when there is an OV/UV condition sensed. FIG. 6A shows the signal 346a goes to HIGH level in the event of OV/UV fault. The signal 346a would then bring status signal to LOW level through OR gate 388a (FIG. 6E).

The DC-ON signal is used to ramp up DC bias voltage on speed signal at start-up (FIG. 5C). When DC-ON is at a HIGH level, the transistor 470 is ON and the transistor 472 is off allowing capacitor 472a to charge to the VREF level. The voltage across the capacitor 472a is added to speed signal as a DC bias through the buffer/amplifier 474. The DC bias voltage is zero when DC-ON is LOW as transistor 472 will be ON to discharge the capacitor 472a. At start-up, DC bias voltage ramps up to VREF as capacitor 472a charges up.

Turning now to FIG. 6B, an IAI input from the current sensing circuit 175 provides a signal proportional to RMS current in the inverter circuit. If this current is too low during operation of the motor, a STOP output is generated. The IA1 input is amplified by a factor of 80 by two amplifiers 480, 482. This amplified signal is evaluated by a comparator 484 whose output goes high whenever the invertor current is less than about one ampere. If a signal labeled G is low when the IA1 input indicates too low a current, the system is shut down with a STOP output.

The G input corresponds to the DC-95 signal. (See FIG. 6C.) During normal motor operation the DC-95 signal is low so that the AND gate 486 normally transmits stop signals sensed at the IA1 input. When the DC-95 condition occurs, however, the STOP signal is not generated so that the AND gate 486 is disabled When the DC-95 output is high a low current is maintained on the motor windings and the inverter current is low. The STOP signal 300 should not be generated, however, and disabling the AND gate 486 accomplishes this.

Turning to FIG. 6E, one sees that an output F from the AND gate 486 is coupled to an AND gate 490. An additional input to the AND 490 gate comes from a delay circuit 492 that imposes a 300 millisecond delay when the motor is first energized. Without this delay the sensing of too-low invertor current would de-activate the motor each time an attempt was made to start the motor. An output from the AND gate 490 is coupled to the OR gate 348 for generating the STOP output 300.

The fault latch reset command is taken from RS latch 387a. In the absence of PWMD signal (no speed control command) the latch 387a is reset and its Q output resets the fault latches 349 and 387 as shown in FIG. 6E.

Operation

During normal operation of the motor control, a pulse width modulation signal causes the motor to rotate at a rate of 30-120 hertz. The frequency output from the current controlled oscillator 220 assures the correct motor speed by appropriate clocking of the counter 260 and delays imposed by the cascaded flip-flops 270.

As the motor speed changes the volts/hertz across the motor winding is adjusted to maintain motor torque a constant. The constant volt/hertz operation is assured since the same control signal ACCEL (FIG. 5C) proportionally controls frequency (through the amplifier 214) and voltage (through the amplifier 215).

The present invention has been described with a degree of particularity. Although a preferred configuration for the circuit 70 has been described other implementations of this control are possible It is the intent that the invention include all modifications and alterations from the disclosed preferred design falling within the spirit or scope of the appended claims.

I claim:

1. Apparatus for activating either a two-phase induction compressor motor or a three-phase induction compressor motor to control a flow of refrigerant through a heat exchanger comprising:
   a. a rectifier for converting a single phase, alternating current signal to a direct current voltage for energizing phase windings of the compressor motor;
   b. input means for receiving a speed control input signal designating a target compressor motor speed and for designating either a two-phase or a three-phase induction compressor motor;
   c. processing means including:
      i. means for converting the control input signal into a cyclicly varying signal having a frequency related to the target motor speed;
      ii. means for generating multiple pulse width modulated motor energization waveforms to maintain motor torque as the motor speed varies in response to the speed control input signal; and
      iii. means for phase shifting the multiple motor energization waveforms including means to select and create two-phase shifted motor energization waveforms for a two-phase induction compressor motor and to select and create three-phase shifted motor energization waveforms for a three phase induction compressor motor; and
   d. output means coupled to said processing means and including switches for coupling the direct current voltage across the phase windings of the induction compressor motor in synchronism with the phase shifted motor energization waveforms.

2. The apparatus of claim 1 wherein the means for converting comprises a current controlled oscillator for converting the speed control input signal to a repetitive series of clock pulses having a repetition rate related to the target motor speed.

3. The apparatus of claim 2 wherein the processing means additionally comprises a step voltage generator clocked by the repetitive series of clock pulses and wherein an output from the step voltage generator approximates a sinusoidally varying signal.

4. The apparatus of claim 3 wherein the output from the step voltage generator is compared with a sawtooth voltage output from the current controlled oscillator to produce a pulsed gating signal.

5. The apparatus of claim 1 where the output means comprises high speed switching transistors to apply the direct current voltage across multiple motor windings of said motor that are turned on and off by the phase shifted motor energization waveforms.

6. The apparatus of claim 1 wherein the processing means comprises sensor means for sensing the alternating current signal and for de-activating the motor if said alternating current signal exceeds a threshold current.

7. The apparatus of claim 6 wherein the sensor means comprises means for sensing alternating current voltage and said sensor means de-activates the motor in response to a sensed alternating current overvoltage or a sensed alternating current undervoltage.

8. The apparatus of claim 6 wherein the sensor means comprises means for sensing the current of the direct current voltage from the rectifier and de-activates the motor in response to an over current.

9. The apparatus of claim 5 further comprising means for adjusting the speed of motor operation based on sensed current through the high-speed switching transistors.

10. Apparatus for activating a multiphase induction compressor motor to control a flow of refrigerant through a heat exchanger by coupling a direct current voltage across phase windings of the multiphase induction compressor motor; said apparatus comprising
    a. a custom integrated circuit including:
       i. input means for receiving a speed control input signal for controlling a target compressor motor speed;
       ii. oscillator means for converting the control input signal into a cyclicly varying signal having a frequency related to the target compressor motor speed;
       iii. modulation means coupled to the oscillator means for generating three phase shifted pulse width modulated motor energization waveforms at a frequency related to the cyclicly varying signal and that simulate sinusoidally varying waveforms for maintaining motor torque as the motor speed varies in response to the speed control input signal; and iv. logic means for controlling transfer of three phase shifted motor energization waveforms to outputs from the custom integrated circuit; and b. switching circuitry coupled to the custom integrated circuit outputs for coupling the direct current voltage to the phase windings of the induction compressor motor in synchronism with the phase shifted motor energization waveforms.

11. Apparatus for activating a three-phase induction compressor motor to control a flow of refrigerant through a heat exchanger comprising:

a. a rectifier circuit for converting a single phase, alternating current signal to a direct current voltage for energizing phase windings of the three-phase induction compressor motor;

b. a custom integrated circuit including:
  i. input means for receiving a speed control input signal for controlling a target compressor motor speed;
  ii. oscillator means for converting the control input signal into a cyclicly varying signal having a frequency related to the target compressor motor speed;
  iii. modulation means coupled to the oscillator means for generating three phase shifted pulse width modulated motor energization waveforms at a frequency related to the cyclicly varying signal to maintain motor torque as the motor speed varies in response to the speed control input signal; and
  iv. gate control means for controlling transfer of the three phase shifted motor energization waveforms to outputs from the custom integrated circuit;

c. switching circuitry coupled to the custom integrated circuit outputs for coupling the direct current voltage to the phase windings of the induction compressor motor in synchronism with the phase shifted motor energization waveforms; and d. protection circuitry coupled to the custom integrated circuit for inhibiting transfer of the three phase shifted motor energization waveforms from the custom integrated circuit outputs to the switching circuitry if current in the rectifier circuit or the switching circuitry exceeds a predetermined threshold.

12. The apparatus of claim 11 wherein the custom integrated circuit further comprises means for converting the speed control input signal to a DC speed control signal and further comprising:
  i. processing means external to the custom integrated circuit for converting the DC signal to a speed command and a voltage command; and
  ii. interface means for coupling the speed command to the oscillator means and for coupling the voltage command to the modulation means to provide a linear voltage vs. frequency relationship and a substantially constant motor flux.

13. The apparatus of claim 11 wherein the custom integrated circuit additionally comprises means to energize motor windings without rotating the motor to generate heat for pre-start warm-up of the compressor motor.

14. The apparatus of claim 11 additionally comprising means for sensing switching circuitry current and developing a direct current signal proportional to the switching circuitry current and wherein the custom integrated circuit comprises means to reduce motor speed to limit the switching circuitry current and power when the direct current signal exceeds a preset threshold.

15. The apparatus of claim 14 wherein the means for sensing switching circuitry current further comprises means for suspending transfer of the three phase shifted motor energization waveforms in the motor speed is at a predetermined minimum speed.

16. The apparatus of claim 11 additionally comprising means for sensing alternating current input to the rectifier circuit and to develop a DC voltage proportional to an RMS value of the alternating current and the custom integrated circuit comprises means for reducing a frequency of the phase shifted pulse width modulated motor energization waveforms to limit the current and power on the switching circuitry when the DC voltage exceeds a preset level.

17. The apparatus of claim 16 wherein the means for sensing alternating current further comprises means for suspending transfer of the three phase shifted motor energization waveforms in the motor speed is at a predetermined minimum speed.

18. The apparatus of claim 11 wherein the protection circuitry additionally comprises means for sensing alternating current voltage and in the event of an under or overvoltage, inhibiting operation of the switching circuitry.

19. The apparatus of claim 18 wherein the alternating current signal is applied across two inputs of the rectifier circuit and the protection circuitry monitors short circuits across the two inputs and short circuits between one of said two inputs and ground, and wherein the line-to-line and line-to-ground short circuits of the two inputs are sensed through a common network to develop a DC voltage to activate the switching circuitry shutdown in the event of either short circuit condition.

20. The apparatus of claim 11 wherein the protection circuitry monitors both a direct current going to the switching circuitry and a difference in direct currents going to and coming from the switching circuitry to develop a D.C. voltage to shut down the switching circuitry in the event of a short circuit between any two output phases of the switching circuitry or any output phase and ground.

21. Apparatus for activating a multi-phase induction compressor motor to control a flow of refrigerant through a heat exchanger comprising:

a. a rectifier circuit for converting a single phase, alternating current signal to a direct current voltage for energizing phase windings of the compressor motor;

b. a processing circuit means including:
  i. input means for receiving a speed control input signal designating a target compressor motor speed and producing a direct current speed control signal;
  ii. oscillator means coupled to an oscillator control input for generating a cyclicly varying signal having a frequency related to the target motor speed;
  iii. modulation means having a speed control input coupled to receive the cyclicly varying signal and a modulation control input for generating multiple phase shifted pulse width modulated motor energization waveforms to control motor torque as motor speed varies; and iv. gate control means for controlling transfer of the phase shifted motor energization waveforms from the processing circuit means; and c. switching circuitry coupled to the processing circuit means for coupling the direct current voltage to the phase windings of the induction compressor motor in synchronism with the multiple phase shifted pulse width modulated motor energization waveforms; and d. circuitry coupled to the processing circuit means for scaling the direct current speed control signal to produce first and second scaled speed control signals wherein the first scaled speed control signal is coupled to the oscillator control input and the second scaled speed control signal is coupled to the modulation means speed control input.

22. A method for activating phase windings of a multi-phase compressor motor by phase shifted motor energization signals to control a flow of refrigerant through a heat exchanger comprising the steps of:

a. rectifying an AC signal to provide a direct current voltage for energizing multiple phase windings o the multi-phase compressor motor;

b. generating a speed control input signal designating a target compressor motor speed;

c. converting the control input signal into a cyclicly varying signal having a fundamental frequency related to the target motor speed;

d. pulse width modulating the phase shifted motor energization signals having a rotation frequency that is a multiple of the fundamental frequency to maintain motor torque as the motor speed varies in response to the speed control input signal;

e. coupling the direct current voltage across the phase windings in synchronism with said phase shifted motor energization signals to cause the compressor motor to operate at the target compressor motor speed with relatively constant motor flux; and f. monitoring the AC signal and suspending the step of coupling the direct current voltage across the phase windings if the voltage of the AC signal exceeds or is less than threshold values.

23. The method of claim 22 wherein the coupling step is accomplished by turning on and off switching transistors in an invertor circuit and additionally comprising the step of monitoring invertor circuit current and reducing the frequency of the cyclicly varying signal if the invertor current exceeds an invertor current threshold value.

* * * * *